(12) United States Patent
George et al.

(10) Patent No.: US 11,873,431 B2
(45) Date of Patent: Jan. 16, 2024

(54) PERSISTENT LUMINESCENT NANOPARTICLE AND ARTICLES COMPRISING THE SAME

(71) Applicant: Thomas Jefferson University, Philadelphia, PA (US)

(72) Inventors: Brian Robert George, Honey Brook, PA (US); Brian Yust, Yardley, PA (US); Abdur Rahaman Sk, Philadelphia, PA (US)

(73) Assignee: Thomas Jefferson University, Philadelphia, PA (US)

( * ) Notice: Subject to any disclaimer, the term of this patent is extended or adjusted under 35 U.S.C. 154(b) by 0 days.

(21) Appl. No.: 17/763,304

(22) PCT Filed: Sep. 25, 2020

(86) PCT No.: PCT/US2020/052633
§ 371 (c)(1),
(2) Date: Mar. 24, 2022

(87) PCT Pub. No.: WO2021/062094
PCT Pub. Date: Apr. 1, 2021

(65) Prior Publication Data
US 2022/0333005 A1    Oct. 20, 2022

Related U.S. Application Data

(60) Provisional application No. 62/907,089, filed on Sep. 27, 2019.

(51) Int. Cl.
*C09K 11/02*    (2006.01)
*C09K 11/77*    (2006.01)
(Continued)

(52) U.S. Cl.
CPC ........ *C09K 11/025* (2013.01); *C09K 11/7758* (2013.01); *C09K 11/7769* (2013.01);
(Continued)

(58) Field of Classification Search
CPC .............. C09K 11/025; C09K 11/7774; C09K 11/7769; C09K 11/7758; C09K 11/7792
See application file for complete search history.

(56) References Cited

U.S. PATENT DOCUMENTS 5,424,006 A * 6/1995 Murayama ......... C09K 11/7734
                                                      252/301.4 R
5,770,110 A * 6/1998 Schrell ..................... D01F 2/14
                                                      252/301.36
(Continued)

FOREIGN PATENT DOCUMENTS

CN        106511101      *   3/2017
JP          4523709      *   6/2010
(Continued)

OTHER PUBLICATIONS

Chen, G. et al. Upconversion Nanoparticles: Design, Nanochemistry, and Applications in Theranostics. Chem. Rev. 2014, 114, 5161.
(Continued)

*Primary Examiner* — C Melissa Koslow
(74) *Attorney, Agent, or Firm* — Riverside Law LLP

(57) ABSTRACT

An article comprising a luminescent nanoparticle is described, wherein the luminescent nanoparticle is selected from the group consisting of oxide nanoparticles, aluminate nanoparticles, and germanate nanoparticles; and wherein the luminescent nanoparticle is doped with one or more metals or rare-earth elements. A method of making a luminescent nanoparticle is also described, the method comprising the steps of: providing a nanoparticle, wherein the nanoparticle is doped with one or more chemical elements, and heating the nanoparticle to a temperature of between about 1000° C. and about 1200° C. to alter the crystal structure of the nanoparticle and/or to create oxygen vacancies in the nanoparticle. A persistent luminescent nanoparticle is described, said persistent luminescent nanoparticle being selected from
(Continued)

the group consisting of: LaAlO$_3$ nanoparticles, Gd$_2$O$_3$ nanoparticles, SrAl$_2$O$_4$ nanoparticles, Y$_2$O$_3$ nanoparticles, and combinations thereof; wherein the nanoparticle is doped with about 1 mol % or less of a chemical element selected from the group consisting of: holmium, europium, ytterbium, neodymium, magnesium, and combinations thereof.

11 Claims, 18 Drawing Sheets

(51) Int. Cl.
  *B82Y 20/00* (2011.01)
  *B82Y 40/00* (2011.01)
(52) U.S. Cl.
  CPC ...... *C09K 11/7774* (2013.01); *C09K 11/7792* (2013.01); *B82Y 20/00* (2013.01); *B82Y 40/00* (2013.01)

(56) References Cited

U.S. PATENT DOCUMENTS

| | | | | |
|---|---|---|---|---|
| 2004/0120684 | A1* | 6/2004 | Ishibashi | G06F 3/0202 385/39 |
| 2008/0113214 | A1* | 5/2008 | Davis | C09K 11/883 428/690 |
| 2011/0175029 | A1* | 7/2011 | Comanzo | C09K 11/7792 252/301.6 R |
| 2011/0210658 | A1 | 9/2011 | Pan | |
| 2013/0150809 | A1 | 6/2013 | Whiteford | |
| 2015/0105284 | A1 | 4/2015 | Willson | |
| 2018/0050220 | A1 | 2/2018 | Sepahvandi | |

FOREIGN PATENT DOCUMENTS

| | | | |
|---|---|---|---|
| TW | 2017-16543 | * | 5/2017 |
| WO | WO 2019/009495 | * | 1/2019 |

OTHER PUBLICATIONS

Dacosta, M. V. et al. Lanthanide upconversion nanoparticles and applications in bioassays and bioimaging: a review. Anal. Chim. Acta. 2014, 832, 1.

Lin, Y. et al. Anomalous afterglow from Y2O3-based phosphor. J. Alloys Compd. 2003, 361, 92.

Luo, H. et al. Charge Carrier Trapping Processes in RE2O2S (RE=La, Gd, Y, and Lu). J. Phys. Chem. C. 2017, 121, 8760.

Van den Eeckhout, K. et al. Persistent Luminescence in Non-Eu2+-Doped Compounds: A Review. Materials. 2013, 6, 2789.

Wang, J. et al. Recent progress in biomedical applications of persistent luminescence nanoparticles. 2017, 9, 6204.

Xu, J.; Tanabe, S. Persistent luminescence instead of phosphorescence: History, mechanism, and perspective. J. Lumin. 2019, 205, 581.

* cited by examiner

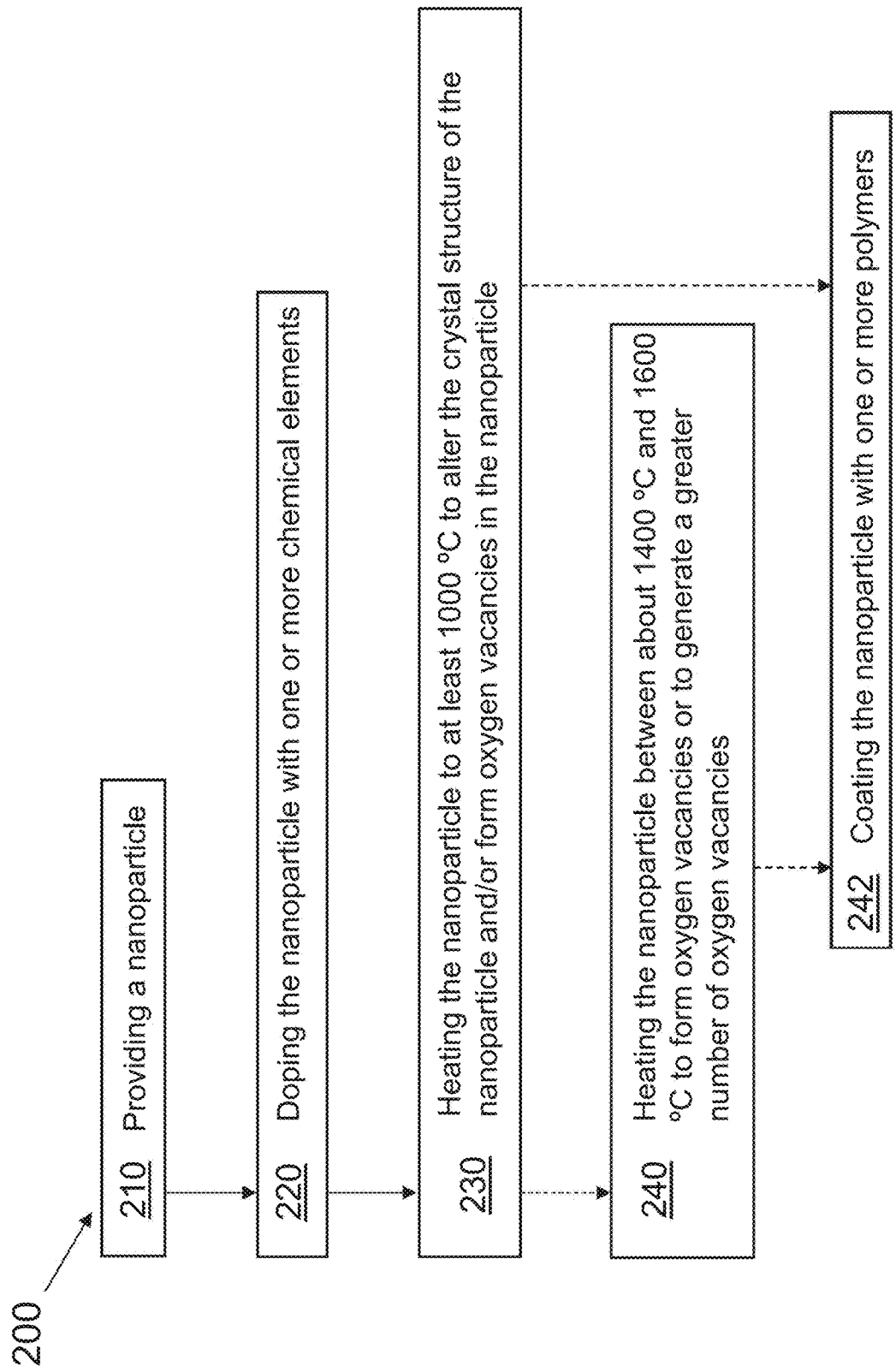

PERSISTENT LUMINESCENT NANOPARTICLE AND ARTICLES COMPRISING THE SAME

CROSS-REFERENCE TO RELATED APPLICATIONS

The present application is a 35 U.S.C. § 371 national phase application from, and claiming priority to, International Application PCT/US2020/052633; filed Sep. 25, 2020, which claims priority to U.S. Provisional Application No. 62/907,089, filed Sep. 27, 2019, all of which applications are incorporated herein by reference in their entireties.

BACKGROUND OF THE INVENTION

Persistent luminescent nanoparticles (PLNPs) are those which can store an amount of energy locally and release it slowly in the form of light. A few of the most commonly known applications include glow-in-the-dark stickers and toys as well as indiglo face watches. Thus far, nearly all fundamental and applied research on these materials has focused on persistent luminescence in the visible region (Xu, Jian et al., J. Luminescence, 2019, 205:581-620; Van den Eeckhout, K. et al., Materials, 2013, 6:2789-2818). However, there is nothing prohibiting the proposed persistent luminescent mechanisms from taking place in other spectral regions, namely the near-infrared. As such, there is a fundamental science need to explore this phenomenon in other spectral regions to further the understanding of the physical principles involved.

There are many practical and entrepreneurial applications of PLNPs and materials comprising PLNPs, yet there has been very little published research on incorporating persistent luminescent materials into textiles and fabrics. Beyond the novelty of incorporating these materials, there are unexplored real-world applications for low-light identification of individuals. Specifically, tactical missions and search-and-rescue operations would benefit greatly from their use, providing an ability to identify and locate individuals at a distance in low-light situations without external light sources like spotlights or reflecting lasers.

There is a need in the art for a method of making persistent luminescent nanoparticles and articles comprising PLNPs. The present invention satisfies this unmet need.

SUMMARY OF THE INVENTION

In one aspect, the present invention relates to an article comprising a luminescent nanoparticle, wherein the luminescent nanoparticle is selected from the group consisting of oxide nanoparticles, aluminate nanoparticles, and germanate nanoparticles; wherein the luminescent nanoparticle is doped with one or more metals or rare-earth elements. In one embodiment, the article is selected from the group consisting of fiber, yarn, fabric, plastic, metal, and composite. In one embodiment, the luminescent nanoparticle is selected from the group consisting of: $LaAlO_3$ nanoparticles, $Gd_2O_3$ nanoparticles, $SrAl_2O_4$ nanoparticles, $Y_2O_3$ nanoparticles, and combinations thereof. In one embodiment, the metal or rare-earth element is selected from the group consisting of: holmium, europium, ytterbium, neodymium, magnesium, and combinations thereof. In one embodiment, the luminescent nanoparticle is doped with between about 0.25 mol % and about 12 mol % of one or more metals or rare-earth elements. In one embodiment, the luminescent nanoparticles comprise persistent luminescent nanoparticles.

In one embodiment, the luminescent nanoparticle comprises a polymeric coating. In one embodiment, the polymeric coating is selected from the group consisting of: polyvinylpyrrolidone, polylactic acid, latex, and combinations thereof. In one embodiment, the article comprises a yarn or fabric article which comprises fibers, yarn, or fabric that have been sprayed with a solution comprising the luminescent nanoparticles. In one embodiment, the article comprises a yarn or fabric article which comprises fibers that have been electrospun, gel-spun, melt-spun, solvent-spun, or dry-spun from a solution or mixture comprising the luminescent nanoparticles.

In one embodiment, the article emits at a wavelength or range of wavelengths after the luminescent nanoparticle is excited with an excitation source. In one embodiment, the article emits in the infrared region of the electromagnetic spectrum. In one embodiment, the excitation source comprises a UV light source.

In another aspect, the present invention relates to a method of making a luminescent nanoparticle, comprising the steps of: providing a nanoparticle, wherein the nanoparticle is doped with one or more chemical elements, and heating the nanoparticle to a temperature of at least 1000° C. to alter the crystal structure of the nanoparticle and/or to create oxygen vacancies in the nanoparticle. In one embodiment, the method further comprises the step of heating the nanoparticle between about 1400° C. and about 1600° C. to form oxygen vacancies in the nanoparticle or to generate a greater number of oxygen vacancies in the nanoparticle. In one embodiment, the nanoparticle is selected from the group consisting of: $LaAlO_3$ nanoparticles, $Gd_2O_3$ nanoparticles, $SrAl_2O_4$ nanoparticles, $Y_2O_3$ nanoparticles, and combinations thereof. In one embodiment, the one or more chemical elements are selected from the group consisting of: holmium, europium, ytterbium, neodymium, magnesium, and combinations thereof. In one embodiment, the luminescent nanoparticle emits at a wavelength or range of wavelengths after the luminescent nanoparticle is excited with an excitation source. In one embodiment, the luminescent nanoparticle emits in the infrared region of the electromagnetic spectrum after the luminescent nanoparticle is excited with a UV light source. In one embodiment, the luminescent nanoparticle comprises a persistent luminescent nanoparticle.

In another aspect, the present invention relates to a persistent luminescent nanoparticle selected from the group consisting of: $LaAlO_3$ nanoparticles, $Gd_2O_3$ nanoparticles, $SrAl_2O_4$ nanoparticles, $Y_2O_3$ nanoparticles, and combinations thereof; wherein the nanoparticle is doped with about 1 mol % or less of a chemical element selected from the group consisting of: holmium, europium, ytterbium, neodymium, magnesium, and combinations thereof.

BRIEF DESCRIPTION OF THE DRAWINGS

The following detailed description of various embodiments of the invention will be better understood when read in conjunction with the appended drawings. For the purpose of illustrating the invention, there are shown in the drawings illustrative embodiments. It should be understood, however, that the invention is not limited to the precise arrangements and instrumentalities of the embodiments shown in the drawings.

FIG. 2 is a flowchart of an exemplary method of forming a persistent luminescent nanoparticle.

FIG. 3, comprising FIG. 3A, FIG. 3B, FIG. 3C depicts the emission spectra of $LaAlO_3$ under 980 nm excitation.

DETAILED DESCRIPTION

Figure 1:
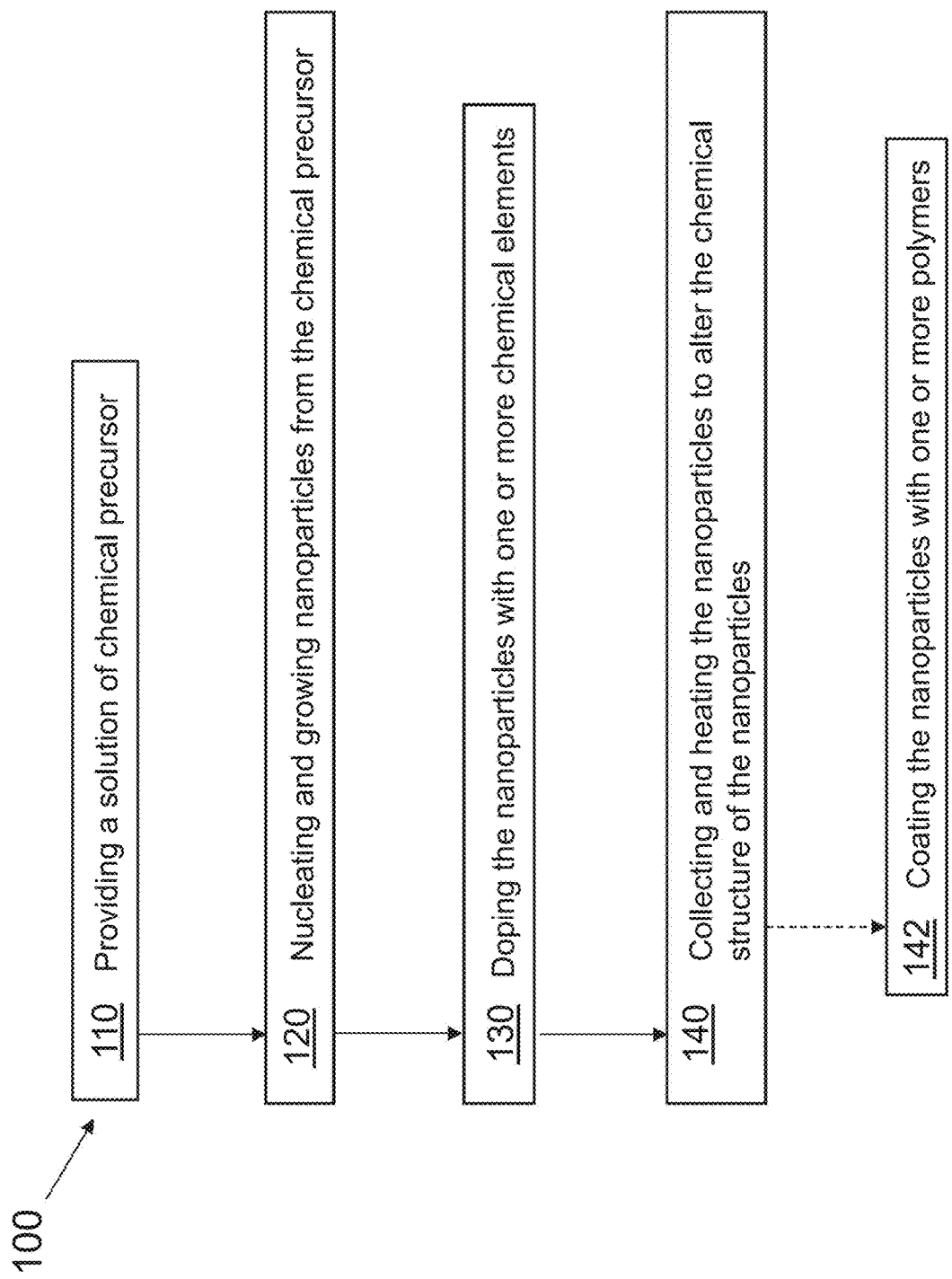
FIG. 1 is a flowchart of an exemplary method of forming a luminescent nanoparticle.

It is to be understood that the Figures and descriptions of the present invention have been simplified to illustrate elements that are relevant for a clear understanding of the present invention, while eliminating, for the purpose of clarity, many other elements found in composite materials and methods of making. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

As used herein, each of the following terms has the meaning associated with it in this section. Unless defined otherwise, all technical and scientific terms used herein generally have the same meaning as commonly understood by one of ordinary skill in the art to which this invention belongs.

The articles "a" and "an" are used herein to refer to one or to more than one (i.e. to at least one) of the grammatical object of the article. By way of example, "an element" means one element or more than one element.

As used herein, the term "about" will be understood by persons of ordinary skill in the art and will vary to some extent depending on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DESCRIPTION

Luminescent Nanoparticle Composition

In one aspect, the present invention relates to a composition comprising a luminescent nanoparticle. The nanoparticle can be any luminescent nanoparticle known to a person of skill in the art. Exemplary nanoparticles include, but are not limited to, $LuPO_4$, $LaPO_4$, $YPO_4$, $ScPO_4$, $GdPO_4$, $CaTiO_3$, $BaTiO_3$, $SrTiO_3$, $NaNbO_3$, $KNbO_3$, $SrSc_2O_3$, $CaSiO_3$, $SrSiO_3$, $BaSiO_3$, metal oxide nanoparticles such as NiO, ZnO, $MnO_2$, CaO, CuO, $CeO_2$, $Ag_2O$, $Fe_2O_3$, $TiO_2$, $Y_2O_3$, $La_2O_3$, $Yb_2O_3$, $Ho_2O_3$, $Tm_2O_3$, $CeO_2$, $Lu_2O_3$, $Tb_4O_7$, $Nd_2O_3$, $Sm_2O_3$, $Gd_2O_3$, $Er_2O_3$, $Pr_6O_{11}$, $Eu_2O_3$, $Dy_2O_3$, MgO, SrO, BaO, $TiO_2$, $ZrO_2$, FeO, $V_2O_3$, $V_2O_5$, $Mn_2O_3$, $Al_2O_3$, $SiO_2$, $Co_3O_4$, and combinations thereof; aluminate nanoparticles such as $CoAl_2O_4$, $NiAl_2O_4$ and $CuAl_2O_4$, $MgAl_2O_4$, $ZnAl_2O_4$, $SrAl_2O_4$, $CaAl_2O_4$, $BaAl_2O_4$, $GdAlO_3$, $EuAlO_3$, $ErAlO_3$, $NdAlO_3$, $HoAlO_3$, $TmAlO_3$, $SmAlO_3$, $TbAlO_3$, $YAlO_3$, $YbAlO_3$ $Al_2FeO_4$, $LaAlO_3$, $LiAlO_2$, $AlCeO_3$, $Sr_2SnO_4$, $Ca_2SnO_4$, $Ba_2SnO_4$, $ZnGa_2O_4$, $Gd_2O_2CO_3$, and combinations thereof; and germanate nanoparticles such as $Bi_4Ge_3O_{12}$, $MgGeO_3$, $CaGeO_3$, $ZnGeO_3$, $FeGeO_3$, $Ca_2Ge_7O_{16}$, $SrGe_4O_9$, $BaGe_4O_9$, $CuGeO_3$, $HfGeO_4$, $ThGeO_4$, $GeO_3Pb$, and combinations thereof; titanate nanoparticles, nickelate nanoparticles, silicate nanoparticles, and niobate nanoparticles. In one embodiment, the luminescent nanoparticle is a $La_2O_3$ nanoparticle. In one embodiment, the luminescent nanoparticle is a $LaAlO_3$ nanoparticle. In one embodiment, the luminescent nanoparticle is a $Gd_2O_3$ nanoparticle. In one embodiment, the luminescent nanoparticles is a $SrAl_2O_4$ nanoparticle. In one embodiment, the luminescent nanoparticle is a $Y_2O_3$ nanoparticle. In one embodiment, the luminescent nanoparticles are doped with one or more chemical elements. In one embodiment, the nanoparticles are doped with a metal. Exemplary metals include, but are not limited to, manganese, chromium, bismuth, magnesium, scandium, titanium, vanadium, chromium, iron, cobalt, nickel, copper, zinc, zirconium, niobium, molybdenum, technetium, ruthenium, rhodium, palladium, silver, cadmium, hafnium, tantalum, tungsten, rhenium, osmium, iridium, platinum, gold, and mercury. In one embodiment, the nanoparticles are doped with a rare-earth element. Exemplary rare-earth elements include yttrium, lanthanum, cerium, praseodymium, neodymium, promethium, samarium, europium, gadolinium, terbium, dysprosium, holmium, erbium, thulium, ytterbium, lutetium, scandium, and combinations thereof. In one embodiment, the luminescent nanoparticles are doped with holmium. In one embodiment, the luminescent nanoparticles are doped with europium. In one embodiment, the luminescent nanoparticles are doped with ytterbium. In one embodiment, the luminescent nanoparticles are doped with neodymium.

In one embodiment, in the doped nanoparticle, one or more chemical elements replace a small amount of the atoms in the non-doped luminescent nanoparticle with the chemical element. In one embodiment, doping with one or more chemical elements replaces a small amount of the cations in the luminescent nanoparticle with the chemical element. In one embodiment, the luminescent nanoparticles are doped with between 0.01 mol % and 50 mol % of one or more chemical elements. In one embodiment, the luminescent nanoparticles are doped with between 0.01 mol % and 45 mol % of one or more chemical elements. In one embodiment, the luminescent nanoparticles are doped with between 0.01 mol % and 40 mol % of one or more chemical elements. In one embodiment, the luminescent nanoparticles are doped with between 0.01 mol % and 35 mol % of one or more chemical elements. In one embodiment, the luminescent nanoparticles are doped with between 0.01 mol % and 30 mol % of one or more chemical elements. In one embodiment, the luminescent nanoparticles are doped with between 0.01 mol % and 25 mol % of one or more chemical elements. In one embodiment, the luminescent nanoparticles are doped with between 0.01 mol % and 20 mol % of one or more chemical elements. In one embodiment, the luminescent nanoparticles are doped with between 0.01 mol % and 15 mol % of one or more chemical elements. In one embodiment, the luminescent nanoparticles are doped with between 0.25 mol % and 12 mol % of one or more chemical elements. In one embodiment, the luminescent nanoparticles are doped with between 0.25 mol % and 12 mol % of one or more rare-earth elements.

In one embodiment, the luminescent nanoparticle comprises oxygen vacancies. In one embodiment, the oxygen vacancies act as traps for energetic electrons. In one embodiment, the energy from the energetic electrons is transferred to the chemical elements that are doped into the nanoparticle and the doped chemical elements release the energy as light. In one embodiment, the energy from the energetic electrons is transferred to rare-earth elements that are doped into the nanoparticle and the doped rare-earth elements release the energy as light. In one embodiment, the release of light from the nanoparticles doped with chemical elements leads to persistent luminescence.

In one embodiment, the surface of the luminescent nanoparticle is coated with one or more polymers. The polymer can be any polymer known to a person of skill in the art. Exemplary polymers include, but are not limited to, those made from one or more of the following monomers: N-(tert-Butyl)acrylamide; N-decyl acrylamide; N-decyl methacrylate; N-dodecyl methacrylamide; 2-ethylhexyl acrylate; 1-hexadecyl methacrylate; n-myristyl acrylate; N, (n-octadecyl) acrylamide; octyl acrylate; decyl acrylate; n-octadecyltriethoxysilane; N-tert-octyl acrylate; stearyl acrylate; stearyl methacrylate; vinyl laurate; vinyl stearate; bromopropyltrichlorosilane; 1H,1H,7H-dodecafluoroheptyl methacrylate; 2-fluorostyrene; 4-fluorostyrene; styrene; 1H,1H,2H,2H-heptadecafluorodecyl acrylate; 1H,1H,2H,2H-heptadecafluorodecyl methacrylate; 1H,1H-heptafluorobutyl acrylate; 1H,1H-heptafluorobutyl methacrylate; 1H,1H,4H-hexafluorobutyl acrylate; 1H,1H,4H-hexafluorobutyl methacrylate; hexafluoro-iso-propyl acrylate; methacryloyl fluoride; 1H,1H-pentadecafluorooctyl acrylate; 1H,1H-pentadecafluorooctyl methacrylate; pentafluorophenyl acrylate; pentafluorophenyl methacrylate; 2,3,4,5,6-pentafluorostyrene; 1H,1H,3H-tetrafluoropropyl acrylate; 1H,1H,3H-tetrafluoropropyl methacrylate; 2,2,2-trifluoroethyl acrylate; 2,2,2-trifluoroethyl methacrylate; acrylamide; N-isopropyl acrylamide; acrylic acid; methacrylic acid; methyl acrylate; ethyl acrylate; 2-chloroethyl vinyl ether; 2-ethylhexyl acrylate; hydroxyethyl methacrylate; butyl acrylate; butyl methacrylate; 2,2-bi s[(acryloyloxy)methyl] butyl acrylate (TMPTA); N-acryloyl tris(hydroxymethyl) methylamine; bisacrylamidoacetic acid; di-acrylate; hydroxyethylmethacrylate; glycerol mono(meth)acrylate; 4-hydroxybutyl methacrylate; 2-hydroxyethyl acrylate; 2-hydroxyethyl methacrylate (glycol methacrylate); N-(2-hydroxypropyl)methacrylamide; N-methacryloyl tris(hydroxymethyl)methylamine; 2-sulfoethyl methacrylate; 1,1,1-trimethylolpropane monoallyl ether; N-vinyl-2-pyrrolidone (1-vinyl-2-pyrrolidinone); 3-aminopropyltriethoxysilane; acrylated aromatic and urethane oligomers; vinyl silicones; silicone acrylate; bis-acrylamide; ethoxylated trimethylol propane triacrylate; sulfonated styrene; lactic acid; citric acid; oxalic acid; uric acid; and malic acid. In one embodiment, the monomer is lactic acid. In one embodiment, the monomer is N-vinylpyrrolidone. In one embodiment, the monomer is styrene.

Exemplary polymers include, but are not limited to, polyethylene glycol; ethylene glycol; polypropylene glycol; polylactic acid; polyvinyl methyl ether; polyvinyl ethyl ether; polyvinyl alcohol; polyvinyl esters such as polyvinyl acetate and poly(vinyl cinnamate); polyvinylpyrrolidone; polyacrylics and polyacrylates such as polyhydroxypropyl acrylate, poly(methyl acrylate), poly (methyl methacrylate), polyacrylic acid; polyesters such as polyglycolide, polyglycolic acid, polylactic acid, polycaprolactone, polyhydroxyalkanoate, polyhydroxybutyrate, polyethylene adipate, polybutylene succinate, poly(3-hydroxybutyrate-co-3-hydroxyvalerate), polyethylene terephthalate, polybutylene terephthalate, polytrimethylene terephthalate, polyethylene naphthalate, and Vectran™; cellulose; unsaturated polyesters; methyl cellulose; hydroxyethyl cellulose; hydroxypropyl methyl cellulose; hydroxypropyl cellulose; ethyl hydroxyethyl cellulose; hydrophobically-modified cellulose; epoxy resins such as bisphenol A diglycidyl ether (DGEBA) resin, novolac epoxy resins, bisphenol E diglycidyl ether (DGEBE) resin, and bisphenol F diglycidyl ether (DGEBF) resin; triacetate polymers such as cellulose triacetate; dextran; hydrophobically-modified dextran; agarose; low-gelling-temperature agarose; latex; pectin; polyvinyl chloride; polypropylene; polyethylene; polystyrene; poly (ethylenimine); poly(ethylene glycol) (N) monomethacrylate; methylmethacrylate; poly(ethylene glycol) (N) monomethyl ether monomethacrylate; nylon; nylon 6; nylon 6,6; chitosan; rayon; polytetrafluoroethylene (Teflon/PTFE); expanded polytetrafluoroethylene (e-PTFE), thermoplastic polyurethanes; polyacrylamides; polyacrylonitriles; and combinations thereof. In one embodiment, the polymer is polylactic acid. In one embodiment, the polymer is polyvinylpyrrolidone. In one embodiment, the polymer is polystyrene. In one embodiment, the polystyrene is latex. In one embodiment, the latex is GF-3088 latex. In one embodiment, polymer coating binds to the surface of the luminescent nanoparticle.

In one embodiment, the luminescent nanoparticle is coated with one or more adhesive agents. The adhesive agent can be any adhesive agent known to a person of skill in the art.

The luminescent nanoparticle can emit at any wavelength known to a person of skill in the art. In one embodiment, the luminescent nanoparticle emits in the visible region of the electromagnetic spectrum. In one embodiment, the luminescent nanoparticle emits in the UV region of the electromagnetic spectrum. In one embodiment, the luminescent nanoparticle emits in the IR region of the electromagnetic spectrum. In one embodiment, the luminescent nanoparticle emits in the near IR (NIR) region of the electromagnetic spectrum. In one embodiment, the luminescent nanoparticle emits in the near X-ray region of the electromagnetic spectrum. In one embodiment, the luminescent nanoparticle emits in multiple regions of the electromagnetic spectrum.

In one embodiment, the luminescent nanoparticle emits after it is excited by an excitation source. The excitation source can be any source known to a person of skill in the art. In one embodiment, the excitation source is an electrical source. In one embodiment, the excitation source is a light source.

In one embodiment, the luminescent nanoparticle emits after it is irradiated with one or more light sources that excite the luminescent nanoparticle. In one embodiment, the luminescent nanoparticle is excited with a visible light source. In one embodiment, the luminescent nanoparticle is excited with a UV light source. In one embodiment, the luminescent nanoparticle is excited with an X-ray light source. In one embodiment, the luminescent nanoparticle is excited with an IR light source. In one embodiment, the luminescent nanoparticle is excited with multiple light sources.

The luminescent nanoparticle can emit for any length of time known to a person of skill in the art. In one embodiment, the luminescent nanoparticle emits for between about 1 picosecond and 72 hrs. In one embodiment, the luminescent nanoparticle displays instant luminescence wherein the nanoparticle emits immediately after excitation. In one embodiment, the luminescent nanoparticle displays persistent luminescence wherein the nanoparticle emits for multiple hours after excitation. In one embodiment, the luminescent nanoparticle displays persistent luminescence wherein the nanoparticle emits in the IR region for multiple hours after UV excitation. In one embodiment, the luminescent nanoparticle displays persistent luminescence wherein the nanoparticle emits in the X-ray region for multiple hours after UV excitation. In one embodiment, the luminescent nanoparticle displays persistent luminescence wherein the nanoparticle emits in the X-ray region for multiple hours after gamma or X-ray excitation. In one embodiment, the luminescent nanoparticle displays persistent luminescence wherein the nanoparticle emits in both the IR and X-ray regions for multiple hours after UV excitation. In one embodiment, the luminescent nanoparticle displays persistent luminescence wherein the nanoparticle emits in both the IR and X-ray regions for multiple hours after gamma or X-ray excitation. In one embodiment, the luminescent nanoparticle can be re-excited after the nanoparticle has stopped emitting.

Method of Making a Luminescent Nanoparticle

Method 1:

In one aspect, the invention relates to a method of making a luminescent nanoparticle. In one embodiment, the luminescent nanoparticle comprises a persistent luminescent nanoparticle. Exemplary process 100 is shown in FIG. 1. In step 110, a solution of chemical precursor is provided. In step 120, nucleation and growth of nanoparticles from the chemical precursor is initiated. In step 130, the nanoparticles are doped with one or more chemical elements. In step 140, the nanoparticles are collected and heated to alter the crystal structure of the nanoparticles.

In step 110, the chemical precursor can be any chemical precursor known to a person of skill in the art as being useful for the synthesis of nanoparticles. Exemplary chemical precursors include, but are not limited to, metal oxides such as $NiO$, $ZnO$, $MnO_2$, $CaO$, $CuO$, $CeO_2$, $Ag_2O$, $Fe_2O_3$, $TiO_2$, $Y_2O_3$, $La_2O_3$, $Yb_2O_3$, $Ho_2O_3$, $Tm_2O_3$, $CeO_2$, $Lu_2O_3$, $Tb_4O_7$, $Nd_2O_3$, $Sm_2O_3$, $Gd_2O_3$, $Er_2O_3$, $Pr_6O_{11}$, $Eu_2O_3$, $Dy_2O_3$, $MgO$, $SrO$, $BaO$, $TiO_2$, $ZrO_2$, $FeO$, $V_2O_3$, $V_2O_5$, $Mn_2O_3$, $Al_2O_3$, $SiO_2$, $Co_3O_4$, and combinations thereof; metal nitrates such as $Mg(NO_3)_2$, $Ca(NO_3)_2$, $Sr(NO_3)_2$, $Ba(NO_3)_2$, $Ti(NO_3)_4$, $Zr(NO_3)_4$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Pd(NO_3)_2$, $Cu(NO_3)_2$, $AgNO_3$, $Zn(NO_3)_2$, $AlNO_3$, $Al(NO_3)_3$, and combinations thereof; metal chlorides such as $MgCl_2$, $KCl$, $CaCl_2$, $SrCl_2$, $BaCl_2$, $TiCl_2$, $TiCl_3$, $TiCl_4$, $ZrC_{13}$, $ZrC_{14}$, $CrCl_2$, $CrCl_3$, $CrCl_4$, $MnCl_2$, $FeCl_2$, $FeCl_3$, $CoCl_2$, $CoCl_3$, $NiCl_2$, $PdCl_2$, $CuCl$, $CuCl_2$, $AgCl$, $ZnCl_2$, $AlCl$, $AlCl_3$, and combinations thereof; metal aluminates such as $CoAl_2O_4$, $NiAl_2O_4$ and $CuAl_2O_4$, $MgAl_2O_4$, $ZnAl_2O_4$, $SrAl_2O_4$, $CaAl_2O_4$, $BaAl_2O_4$, $GdAlO_3$, $EuAlO_3$, $ErAlO_3$, $NdAlO_3$, $HoAlO_3$, $TmAlO_3$, $SmAlO_3$, $TbAlO_3$, $YAlO_3$, $YbAlO_3$ $Al_2FeO_4$, $LaAlO_3$, $LiAlO_2$, $AlCeO_3$, $Sr_2SnO_4$, $Ca_2SnO_4$, $Ba_2SnO_4$, $ZnGa_2O_4$, $Gd_2O_2CO_3$, and combinations thereof; and metal germinates such as $NiO$, $ZnO$, $MnO_2$, $CaO$, $CuO$, $CeO_2$, $Ag_2O$, $Fe_2O_3$, $TiO_2$, $Y_2O_3$, $La_2O_3$, $Yb_2O_3$, $Ho_2O_3$, $Tm_2O_3$, $CeO_2$, $Lu_2O_3$, $Tb_4O_7$, $Nd_2O_3$, $Sm_2O_3$, $Gd_2O_3$, $Er_2O_3$, $Pr_{6011}$, $Eu_2O_3$, $Dy_2O_3$, $MgO$, $SrO$, $BaO$, $TiO_2$, $ZrO_2$, $FeO$, $V_2O_3$, $V_2O_5$, $Mn_2O_3$, $Al_2O_3$, $SiO_2$, $Co_3O_4$, $CoAl_2O_4$, $NiAl_2O_4$ and $CuAl_2O_4$, $MgAl_2O_4$, $ZnAl_2O_4$, $SrAl_2O_4$, $GdAlO_3$, $Al_2FeO_4$, $LaAlO_3$, $LiAlO_2$, $AlCeO_3$, $Bi_4Ge_{3O12}$, $MgGeO_3$, $CaGeO_3$, $ZnGeO_3$, $FeGeO_3$, $Ca_2Ge_7O_{16}$, $SrGe_4O_9$, $BaGe_4O_9$, $CuGeO_3$, $HfGeO_4$, $ThGeO_4$, $GeO_3Pb$, and combinations thereof.

In one embodiment, the chemical precursor is $AlNO_3$. In one embodiment, the chemical precursor is $Al(NO_3)_3$. In one embodiment, the chemical precursor is $La_2O_3$. In one embodiment, the chemical precursor is $MgCl_2$.

The solution of chemical precursor can comprise any solvent known to a person of skill in the art. In one embodiment, the solvent is an organic solvent. Exemplary organic solvents include, but are not limited to, hexane, pentane, diethyl ether, dichloromethane, chloroform, benzene, toluene, methanol, ethanol, isopropanol, and ethyl acetate. In one embodiment, the solvent is an aqueous solvent. Exemplary aqueous solvents include, but are not limited to, distilled water, deionized water, saline, and dilute acids such as nitric acid, hydrochloric acid, acetic acid, sulfuric acid, and phosphoric acid.

In one embodiment, the solution of chemical precursor is heated. The solution can be heated to any temperature known to a person of skill in the art. In one embodiment, the solution is heated to between about 30° C. and 300° C. In one embodiment, the solution is heated to between about 30° C. and 280° C. In one embodiment, the solution is heated to between about 30° C. and 260° C. In one embodiment, the solution is heated to between about 30° C. and 240° C. In one embodiment, the solution is heated to between about 30° C. and 220° C. In one embodiment, the solution is heated to between about 30° C. and 200° C. In one embodiment, the solution is heated to between about 30° C. and 180° C. In one embodiment, the solution is heated to between about 30° C. and 160° C. In one embodiment, the solution is heated to between about 30° C. and 140° C. In one embodiment, the solution is heated to between about 30° C. and 120° C. In one embodiment, the solution is heated to between about 30° C. and 100° C. In one embodiment, the solution is heated to between about 60° C. and 100° C. In one embodiment, the solution is heated with stirring.

In one embodiment, the solution of chemical precursor is heated at a pressure above atmospheric pressure. In one embodiment, the solution of chemical precursor is heated in an autoclave above atmospheric pressure. The pressure can be any pressure above atmospheric pressure known to a person of skill in the art.

In step 120, the nucleation and growth of nanoparticles from the chemical precursor is initiated using any compound or method known to initiate the nucleation and growth of nanoparticles. Exemplary compounds to initiate the nucleation and growth of nanoparticles include, but are not limited to, ammonium hydroxide, sodium hydroxide, tetramethylammonium hydroxide, calcium hydroxide, ammonia, potassium hydroxide, lithium hydroxide, strontium hydroxide, barium hydroxide, zinc hydroxide, and combinations thereof. In one embodiment, nucleation and growth of the nanoparticles is initiated by the addition of ammonium hydroxide to the solution of chemical precursor.

In step 130, the nanoparticles can be doped with any chemical elements known to a person of skill in the art. Exemplary chemical elements are described elsewhere herein. In one embodiment, the nanoparticles are doped with one or more rare-earth elements. In one embodiment, the nanoparticles are doped with one or more metals. In one embodiment, the chemical element replaces cations in the nanoparticles. In one embodiment, the chemical element replaces cations in the crystalline structure of the nanoparticle.

In step 140, the nanoparticles can be collected using any technique known to a person of skill in the art. In one embodiment, the nanoparticles are then dried before heating. In one embodiment, the nanoparticles are heated in a furnace. In one embodiment, the furnace comprises a tube furnace. In one embodiment, the nanoparticles are heated between about 200° C. and 3000° C. In one embodiment, the nanoparticles are heated between about 200° C. and 2800° C. In one embodiment, the nanoparticles are heated between about 200° C. and 2600° C. In one embodiment, the nanoparticles are heated between about 200° C. and 2400° C. In one embodiment, the nanoparticles are heated between about 200° C. and 2200° C. In one embodiment, the nanoparticles are heated between about 200° C. and 2000° C. In one embodiment, the nanoparticles are heated between about 200° C. and 1800° C. In one embodiment, the nanoparticles are heated between about 400° C. and 1800° C. In one embodiment, the nanoparticles are heated between about 600° C. and 1800° C. In one embodiment, the nanoparticles are heated between about 800° C. and 1800° C. In one embodiment, the nanoparticles are heated between about 1000° C. and 1800° C. In one embodiment, the nanoparticles are heated between about 1000° C. and 1200° C. In one embodiment, the nanoparticles are heated between about 1400° C. and 1600° C. In one embodiment, the nanoparticles are heated to a temperature of at least 1000° C. In one embodiment, the nanoparticles are heated to a temperature of at least 1100° C. In one embodiment, the nanoparticles are heated to a temperature of at least 1200° C. In one embodiment, the nanoparticles are heated to a temperature of at least 1300° C. In one embodiment, the nanoparticles are heated to a temperature of at least 1400° C. In one embodiment, the nanoparticles are heated to a temperature of at least 1500° C. In one embodiment, the nanoparticles are heated to a temperature of at least 1600° C. In one embodiment, the nanoparticles are first heated between about 1000° C. and 1200° C. and then heated between about 1400° C. and 1600° C.

In one embodiment, the step of heating the nanoparticles to alter the crystal structure additionally comprises the step of forming oxygen vacancies in the nanoparticles. In one embodiment, the step of heating to at least 1000° C. forms oxygen vacancies in the nanoparticles. In one embodiment, the optional step of heating the particles to a temperature between about between about 1400° C. and 1600° C. may generate a greater number of oxygen vacancies in the nanoparticles.

In some embodiments, the step of heating the nanoparticles to alter the crystal structure further comprises step 142, wherein the nanoparticles are coated with one or more polymers. Exemplary polymers are described elsewhere herein. In one embodiment, the polymer is polyvinylpyrrolidone. In one embodiment, the polymer is polylactic acid. In one embodiment, the polymer is latex. In one embodiment, the polymer is GF-3088 latex. In one embodiment, a mixture of nanoparticle and polymer are sonicated to form a nanoparticle coated with one or more polymers.

Method 2:

In one aspect, the invention relates to a method of making a persistent luminescent nanoparticle. Exemplary process 200 is shown in FIG. 2. In step 210, a nanoparticle is provided. In step 220, the nanoparticle is doped with one or more chemical elements. In step 230, the nanoparticle is heated to at least 1000° C. to alter the crystal structure of the nanoparticle and/or form oxygen vacancies in the nanoparticle.

In step 210, the nanoparticle can be any nanoparticle known to a person of skill in the art. Exemplary nanoparticles include, but are not limited to, NiO, ZnO, $MnO_2$, CaO, CuO, $CeO_2$, $Ag_2O$, $Fe_2O_3$, $TiO_2$, $Y_2O_3$, $La_2O_3$, $Yb_2O_3$, $Ho_2O_3$, $Tm_2O_3$, $CeO_2$, $Lu_2O_3$, $Tb_4O_7$, $Nd_2O_3$, $Sm_2O_3$, $Gd_2O_3$, $Er_2O_3$, $Pr_6O_{11}$, $Eu_2O_3$, $Dy_2O_3$, MgO, SrO, BaO, $TiO_2$, $ZrO_2$, FeO, $V_{2O3}$, $V_{2O5}$, $Mn_2O_3$, $Al_2O_3$, $SiO_2$, $Co_3O_4$, $CoAl_2O_4$, $NiAl_2O_4$ and $CuAl_2O_4$, $MgAl_2O_4$, $ZnAl_2O_4$, $SrAl_2O_4$, $GdAlO_3$, $Al_2FeO_4$, $LaAlO_3$, $LiAlO_2$, $AlCeO_3$, $Bi_4Ge_3O_{12}$, $MgGeO_3$, $CaGeO_3$, $ZnGeO_3$, $FeGeO_3$, $Ca_2Ge_7O_{16}$, $SrGe_4O_9$, $BaGe_4O_9$, $CuGeO_3$, $HfGeO_4$, $ThGeO_4$, $GeO_3Pb$, $CaAl_2O_4$, $BaAl_2O_4$, $EuAlO_3$, $ErAlO_3$, $NdAlO_3$, $HoAlO_3$, $TmAlO_3$, $SmAlO_3$, $TbAlO_3$, $YAlO_3$, $YbAlO_3$, $Sr_2SnO_4$, $Ca_2SnO_4$, $Ba_2SnO_4$, $ZnGa_2O_4$, $Gd_2O_2CO_3$, and combinations thereof. In one embodiment, the luminescent nanoparticle is a $La_2O_3$ nanoparticle. In one embodiment, the luminescent nanoparticle is a $LaAlO_3$ nanoparticle. In one embodiment, the luminescent nanoparticle is a $Gd_2O_3$ nanoparticle. In one embodiment, the luminescent nanoparticles is a $SrAl_2O_4$ nanoparticle. In one embodiment, the luminescent nanoparticle is a $Y_2O_3$ nanoparticle.

In step 220, the nanoparticles can be doped with any chemical elements known to a person of skill in the art. Exemplary chemical elements are described elsewhere herein. In one embodiment, the nanoparticles are doped with one or more rare-earth elements. In one embodiment, the nanoparticles are doped with one or more metals. In one embodiment, the chemical element replaces cations in the nanoparticles. In one embodiment, the chemical element replaces cations in the crystalline structure of the nanoparticle.

In step 230, the nanoparticles can be heated using any heating source known to a person of skill in the art. In one embodiment, the nanoparticles are heated in a furnace. In one embodiment, the furnace comprises a tube furnace.

In step 240, the nanoparticles can be heated using any heating source known to a person of skill in the art. In one embodiment, the nanoparticles are heated in a furnace. In one embodiment, the furnace comprises a tube furnace. In one embodiment, step 240 generates oxygen vacancies in the nanoparticle. In another embodiment, step 240 generates more oxygen vacancies in a nanoparticle already containing oxygen vacancies.

In some embodiments, the method further comprises step 240, in which the nanoparticles are heated to between about 1400° C. and about 1600° C. to generate a greater number of oxygen vacancies.

In one embodiment, the method further comprises step 242, wherein nanoparticle is coated with one or more polymers. Exemplary polymers are described elsewhere herein. In one embodiment, the polymer is polyvinylpyrrolidone. In one embodiment, the polymer is polylactic acid. In one embodiment, the polymer comprises latex. In one embodiment, the polymer is GF-3088 latex. In one embodiment, a mixture of nanoparticle and polymer are sonicated to form a nanoparticle coated with one or more polymers.

In some embodiments, the nanoparticles can be cryomilled or otherwise milled or ground to further reduce the size distribution. In one embodiment, the additional milling is performed prior to the high temperature treatment. In one embodiment, the additional milling is performed after the high temperature treatment.

Method of Making a Fiber or Fabric Comprising Luminescent Nanoparticles

In another aspect, the present invention relates in part to a method of making a fiber yarn, or fabric comprising luminescent nanoparticles. In one embodiment, the luminescent nanoparticle comprises a nanoparticle that displays instant luminescence. In one embodiment, the luminescent nanoparticle comprises a persistent luminescent nanoparticle.

The luminescent nanoparticle can comprise any luminescent nanoparticles known to a person of skill in the art. Exemplary luminescent nanoparticles are described elsewhere herein. In one embodiment, the luminescent nanoparticle is a $La_2O_3$ nanoparticle. In one embodiment, the luminescent nanoparticle is a $LaAlO_3$ nanoparticle. In one embodiment, the luminescent nanoparticle is a $Gd_2O_3$ nanoparticle. In one embodiment, the luminescent nanoparticles is a $SrAl_2O_4$ nanoparticle. In one embodiment, the luminescent nanoparticle is a $Y_2O_3$ nanoparticle. In one embodiment, the luminescent nanoparticles are doped with one or more chemical elements. In one embodiment, the chemical element comprises a metal. Exemplary metals are described elsewhere herein. In one embodiment, the chemical element comprises a rare-earth element. Exemplary rare-earth elements are described elsewhere herein.

In one embodiment, the luminescent nanoparticle comprises a polymeric coating. Exemplary monomers and polymers that comprise the polymeric coating are described elsewhere herein. In one embodiment, the polymeric coating comprises polylactic acid. In one embodiment, the polymeric coating comprises polyvinylpyrrolidone. In one embodiment, the polymeric coating comprises latex. In one embodiment, the polymeric coating comprises GR-3088 latex. In one embodiment, the polymeric coating acts as a binder to bind the nanoparticles to the target fiber, yarn, or fabric.

In one embodiment, the luminescent nanoparticle comprises a coating of one or more adhesive agents. The adhesive agent can be any adhesive known to a person of skill in the art.

The fibers, yarns, or fabrics can comprise any fibers known to a person of skill in the art. The fibers can be of natural, man-made, or synthetic origin. Exemplary types of fibers include, but are not limited to, alpaca, angora wool, azlon, byssus, camel hair, cashmere wool, chiengora, lambswool, llama, mohair wool, qiviut, rabbit, silk, vicuña, wool, yak, abacá, acetate, bamboo, banana, kapok, coir, cotton, flax, hemp, jute, kenaf, lyocell, modal, piña, raffia, ramie, rayon, sisal, soy protein, fiberglass, asbestos cloth, acrylic, Kevlar, modacrylic, nomex, nylon, polyester, spandex, rayon, cellulose rayon, Tencel®, cellulose acetate, cellulose triacetate, regenerated proteins, polyethylene terephthalate, polyethylene, polypropylene, aramids, azlons, modacrylics, novoloids, nytrils, vinyl polymers and copolymers, vinal, vinyon, para-aramids, carbon, graphite, and combinations thereof. The fibers, yarns, or fabric can include wovens, knits, nonwovens, braids, stitchbonded fabrics, laminates, multicomponent fabrics, or any combination thereof. Materials can include any products made with these fibers, yarns, and fabrics, including composites, or any combination thereof.

The fibers, yarns, or fabrics comprise fibers of any length known to a person of skill in art. In some embodiment, the fibers include continuous or discontinuous monofilaments, multifilaments, fibrids, fibrillated tapes or films, staple fibers, yarns containing such filaments and/or fibers, and combinations thereof. In one embodiment, the fibers comprise non-fibrous elements. The non-fibrous elements can be any such elements known to a person of skill in the art. Exemplary non-fibrous elements include, but are not limited to, particulate fillers, flock, binders, sizes, and combinations thereof.

In one embodiment, the fiber, yarn, or fabric comprising luminescent nanoparticles is made via extrusion (wet, dry, solvent, melt, electrospinning, gel) of a mixture of polymers and luminescent nanoparticles.

In one embodiment, the fibers, yarns, or fabrics comprising luminescent nanoparticles are made via a coating method. In one embodiment, the coating method comprises the steps of providing a luminescent nanoparticle; and coating a target fiber, yarn, or fabric with the luminescent nanoparticle.

In one embodiment the luminescent nanoparticle comprises a solution of luminescent nanoparticles. The solution can comprise any solvent known to a person of skill in the art. In one embodiment, the solvent is an organic solvent. Exemplary organic solvents are described elsewhere herein. In one embodiment, the solvent is an aqueous solvent. Exemplary aqueous solvents are described elsewhere herein. In one embodiment, the solution comprises an adhesive agent dissolved or dispersed in an aqueous or organic solvent. In one embodiment, the adhesive agent is latex. In one embodiment, the latex is Omnova GF-2544. In one embodiment, the latex solution comprises about 1% to about 60% latex solids. In one embodiment, the latex solution comprises about 1% to about 50% latex solids. In one embodiment, the latex solution comprises about 1% to about 40% latex solids. In one embodiment, the latex solution comprises about 1% to about 30% latex solids. In one embodiment, the latex solution comprises about 10% to about 30% latex solids.

The target yarn, fiber, or fabric can be coated with the luminescent nanoparticles using any method known to a person of skill in the art. In one embodiment, the target yarn, fiber, or fabric is sprayed with a solution comprising the luminescent nanoparticles to form the coating, either continuous or discrete. In one embodiment, the target yarn, fiber, or fabric is sprayed with a handheld sprayer comprising a solution of luminescent nanoparticles to form the coating. In one embodiment, the target yarn, fiber, or fabric is dipped/immersed into a solution comprising the luminescent nanoparticles to form the coating. In one embodiment, the target yarn, fiber, or fabric is heated to soften the article and the luminescent nanoparticles are pressed into the softened plastic. In one embodiment, the luminescent nanoparticles are printed onto the surface of the target yarn, fiber, or fabric to form a coating. In one embodiment, the luminescent nanoparticles are coated with a binder and then printed onto the surface of the target yarn, fiber, or fabric. In one embodiment, portions of the target yarn, fiber, or fabric are covered with a coating comprising the luminescent nanoparticles to form a design. In one embodiment, the coating of luminescent nanoparticles is applied to the target yarn, fiber, or fabric as a solution comprising the luminescent nanoparticles. In one embodiment, the coating of luminescent nanoparticles is applied to the target yarn, fiber, or fabric in a solid form such as a powder.

In one embodiment a solution of adhesive and luminescent nanoparticles is sprayed onto the target yarn, fiber, or fabric. In one embodiment a solution of adhesive and luminescent nanoparticles is applied on to the target yarn, fabric, or fiber via padding.

In one embodiment, the coating method further comprises a step in which the target fiber, yarn, or fabric undergoes a low-temperature treatment. The temperature of this treatment can be any low temperature known to a person of skill in the art. In one embodiment, the target fiber, yarn, or fabric is treated at a temperature of between about 0° C. and about 1000° C. In one embodiment, the target fiber, yarn, or fabric is treated at a temperature of between about 0° C. and about 900° C. In one embodiment, the target fiber, yarn, or fabric is treated at a temperature of between about 0° C. and about 800° C. In one embodiment, the target fiber, yarn, or fabric is treated at a temperature of between about 0° C. and about 700° C. In one embodiment, the target fiber, yarn, or fabric is treated at a temperature of between about 0° C. and about 600° C. In one embodiment, the target fiber, yarn, or fabric is treated at a temperature of between about 0° C. and about 500° C. In one embodiment, the target fiber, yarn, or fabric is treated at a temperature of between about 10° C. and about 500° C. In one embodiment, the target fiber, yarn, or fabric is treated at a temperature of between about 90° C. and about 110° C.

In one embodiment, the temperature of the treatment depends on the fiber content of the target fiber, yarn, or fabric. In one embodiment, the temperature of the treatment depends on the fiber content of the target fiber, yarn, or fabric and can be between about 20° C. and about 400° C. In one embodiment, wherein the target fiber, yarn, or fabric was coated using a luminescent nanoparticle comprising an adhesive agent, the temperature at which the target fiber, yarn or fabric is treated depends on the adhesive agent used. In one embodiment, the temperature of the treatment depends on the adhesive agent used to coat the nanoparticle and can be between about 20° C. and about 400° C. In one embodiment, wherein the target fiber, yarn, or fabric was coated using a luminescent nanoparticle comprising a polymeric coating which acts as a binder, the temperature at which the target fiber, yarn or fabric is treated depends on the polymeric coating used. In one embodiment, the temperature of the treatment depends on the type of polymeric coating on the nanoparticle and can be between about 20° C. and about 400° C.

In one embodiment, the fiber, yarn, or fabric comprising luminescent nanoparticles is made via an electrospinning method. In one embodiment, the electrospinning method comprises the steps of providing a spinneret comprising a solution of luminescent nanoparticles; creating an electrically charged jet comprising the solution; and solidifying the jet on a collector to form the fibers.

In one embodiment, the solution of luminescent nanoparticles further comprises one or more additives. Exemplary additives include, but are not limited to, ceramics, polymers, glass, carbon, and metal oxide. In one embodiment, the additive comprises a polymer. The polymer can comprise any polymer known to form fibers via electrospinning to a person of skill in the art. Exemplary polymers used in electrospinning include, but are not limited to, poly(glycolide) (PGA), poly(lactide-co-glycolide) (PLGA), poly(ε-caprolactone) (PCL), poly(l-lactide) (PLLA), polyurethane (PU), poly(ethylene-co-vinyl alcohol) (PEVA), polystyrene (PS), syndiotactic 1,2-polybutadiene, fibrinogen, poly(vinyl alcohol)/cellulose acetate (PVA/CA), cellulose acetate, poly (vinyl alcohol), silk fibroin, silk/polyethylene oxide, silk, silk/chitosan, chitosan/polyethylene oxide, gelatin, hyaluronic acid (HA), cellulose and cellulose derivatives, gelatin/polyaniline, polyaniline, collagen, chitosan, collagen/chitosan, casein, silk protein, chitin, polyesters, polyacrylics, polyacrylates, polyethylene, polypropylene, polyurethane, nylon, PTFE, e-PTFE, polyethylene oxide, aramid, para-aramid, protein polymers, acetate polymers, rayon, polyvinyl pyrrolidone, and combinations thereof.

The solution of luminescent nanoparticles can comprise any solvent known to a person of skill in the art. In one embodiment, the solvent is an organic solvent. Exemplary organic solvents are described elsewhere herein. In one embodiment, the solvent is an aqueous solvent. Exemplary aqueous solvents are described elsewhere herein. In one embodiment, the solvent is acetone. In one embodiment, the solvent is acetate dissolved or dispersed in acetone.

In one embodiment, the step of creating an electrically charged jet comprising the solution comprises the steps of dispersing the solution from a spinneret or needle and applying a high voltage to the dispersed solution. The solution can be dispersed from the spinneret or needle at any rate known to a person of skill in the art. In one embodiment, the solution is dispersed at a rate of between about 0.1 mL/h and 50 mL/h. In one embodiment, the solution is dispersed as a spray. In one embodiment, the high voltage is between about 1 V and 100 V. In one embodiment, the high voltage is used to inject charge of a certain polarity into the solution of luminescent nanoparticles. In one embodiment, the high voltage is used to inject charge of a certain polarity into the solution comprising a luminescent nanoparticle and one or more additives.

In one embodiment, the step of creating an electrically charged jet comprising the solution occurs at room temperature. In one embodiment, the step of creating an electrically charged jet comprising the solution occurs at an elevated temperature above room temperature. In one embodiment, the step of creating an electrically charged jet comprising the solution occurs at a low temperature below room temperature. In one embodiment, the step of creating an electrically charged jet comprising the solution occurs at normal atmospheric pressure. In one embodiment, the step of creating an electrically charged jet comprising the solution occurs in a vacuum.

The collector can be any collector known to a person of skill in the art of electrospinning. Exemplary collectors include, but are not limited to, a screen/mesh collector, a flat plate collector, a dish collector, a mandrel collector, a rotating drum collector, and a parallel plate collector. In one embodiment, the collector comprises metal. In one embodiment, the collector comprises the opposite polarity of the electrically charged jet of solution. In one embodiment, the collector is grounded. In one embodiment, the solution evaporates before the jet solidifies on the collector. In one embodiment, the step of solidifying the jet on a collector comprises the step of evaporating the solution. In one embodiment, the fibers formed on the collector comprise nanofibers. In one embodiment, the fibers formed on the collector can be used to form a target yarn or fabric.

In one embodiment, the fiber, yarn, or fabric comprising luminescent nanoparticles is made via a melt spinning method. In one embodiment, the melt spinning method comprises the steps of providing a melted thermoplastic polymer; mixing the melted thermoplastic polymer and a luminescent nanoparticle to form a solution; creating a jet comprising the solution; and solidifying the jet on a collector to form fibers.

The thermoplastic polymer can comprise any thermoplastic polymer known to a person of skill in the art. Exemplary thermoplastic polymers include, but are not limited to, polyacrylics/polyacrylates such as poly(methyl methacrylate) and poly (methylacrylate); acrylonitrile butadiene styrene (ABS); polyamides such as nylon, nylon 6, and nylon 6,6; polybenzimidazole (PBI); polycarbonate (PC); polyether sulfone (PES); polyoxymethylene (POM); polyether ether ketone (PEEK); polyetherimide (PEI); polyethylene (PE); ultra-high molecular weight polyethylene (UHMWPE); high density polyethylene (HDPE); medium density polyethylene (MDPE); low density polyethylene (LDPE); polyethylene oxide (PEO); polypropylene oxide (PPO); polyphenylene sulfide (PPS); polypropylene (PP); polyvinyl chloride (PVC); chlorinated polyvinyl chloride (CPVC); polystyrene (PS); polyvinylidene fluoride (PVDF); polytetrafluoroethylene (Teflon, PTFE), expanded polytetrafluoroethylene (e-PTFE); and combinations thereof.

In one embodiment, the solution of melted thermoplastic polymer and luminescent nanoparticle comprises a solvent. In one embodiment, the solvent is an organic solvent. Exemplary organic solvents are described elsewhere herein. In one embodiment, the solvent is an aqueous solvent. Exemplary aqueous solvents are described elsewhere herein.

The jet can be created using any method known to a person of skill in the art. In one embodiment, the jet is created by dispersing the solution from a spinneret or needle. In one embodiment, the jet is created by dispersing the solution from a spinneret or needle and applying a high voltage to the dispersed solution. The solution can be dispersed from the spinneret or needle at any rate known to a person of skill in the art. In one embodiment, the solution is dispersed at a rate of between about 0.1 mL/h and 50 mL/h. In one embodiment, the solution is dispersed as a spray. In one embodiment, the high voltage is between about 1 V and 100 V. In one embodiment, the high voltage is used to inject charge of a certain polarity into the solution of luminescent nanoparticles and thermoplastic polymer.

In one embodiment, the jet is created at room temperature. In one embodiment, the jet is created at an elevated temperature above room temperature. In one embodiment, the jet is created at a low temperature below room temperature. In one embodiment, the jet is created at normal atmospheric pressure. In one embodiment, the jet is created in a vacuum.

The collector upon which the jet is solidified can be any collector known to a person of skill in the art of melt spinning. Exemplary collectors include, but are not limited to, a screen/mesh collector, a flat plate collector, a dish collector, a mandrel collector, a rotating drum collector, and a parallel plate collector. In one embodiment, the collector comprises metal. In embodiments wherein the jet is charged, the collector comprises the opposite polarity of the electrically charged jet of solution. In one embodiment, the collector is grounded. In one embodiment, the solution evaporates before the jet solidifies on the collector. In one embodiment, the step of solidifying the jet on a collector comprises the step of evaporating the solution. In one embodiment, the fibers formed on the collector comprise nanofibers. In one embodiment, the fibers formed on the collector can be used to form a target yarn or fabric.

In one embodiment, unmelted polymer chips are combined with the luminescent nanoparticles. In one embodiment, the combined materials are extruded using any method known to those of skill in the art to form a fiber, yarn, or fabric comprising the luminescent nanoparticles.

Articles Comprising Luminescent Nanoparticles

In one aspect, the present invention relates in part to an article comprising luminescent nanoparticles. The article can be any article known to a person of skill in the art. The luminescent nanoparticles can comprise any luminescent nanoparticles known to a person of skill in the art. Exemplary luminescent nanoparticles are described elsewhere herein. In one embodiment, the luminescent nanoparticles comprise nanoparticles that display instant luminescence. In one embodiment, the luminescent nanoparticles comprise persistent luminescent nanoparticles.

In one embodiment, the article can emit at any wavelength known to a person of skill in the art. In one embodiment, the article emits in the IR region of the electromagnetic spectrum. In one embodiment, the article emits in the X-ray region of the electromagnetic spectrum. In one embodiment, the article emits in both the IR and X-ray region of the electromagnetic spectrum. In one embodiment, the article emits after being excited by an excitation source. Exemplary excitation sources are described elsewhere herein. In one embodiment, the article emits after being excited by a UV light source. In one embodiment, the article emits after being excited by an X-ray light source. In one embodiment, the article emits after being excited by a gamma ray source.

In one embodiment, the article comprising the luminescent nanoparticles comprises fabric or yarn. In one embodiment, the fabric or yarn comprises fibers wherein the luminescent nanoparticles have been applied via the coating method described elsewhere herein. In one embodiment, fabric or yarn article is coated with luminescent nanoparticles via the coating method described elsewhere herein. In one embodiment, the fabric or yarn comprises fibers wherein the luminescent nanoparticles have been incorporated into the fibers using the electrospinning method described elsewhere herein. In one embodiment, the fabric or yarn comprises fibers wherein the luminescent nanoparticles have been incorporated into the fibers using the melt spinning method described elsewhere herein. In one embodiment, the fabric can be fabric made into a specific item. Exemplary fabric items include, but are not limited to, clothing, tents, tarps, sheets, and sails. In one embodiment, the fabric item comprises clothing.

In one embodiment, the article comprising the luminescent nanoparticles comprises a plastic article. The plastic article can be any plastic article known to a person of skill in the art. In one embodiment, the plastic article comprises luminescent nanoparticles that were added to a raw plastic mixture and extruded, injection molded, or blow molded to form the plastic article. In one embodiment, the plastic article is heated to soften the article and then the luminescent nanoparticles are added to the softened plastic.

In one embodiment, the plastic article is covered with a coating comprising the luminescent nanoparticles. In one embodiment, the luminescent nanoparticles are coated with a polymeric coating before coating the plastic article. Exemplary polymers for the polymeric coating are described elsewhere herein. In one embodiment, the polymeric coating acts as a binder to bind the luminescent nanoparticles to the plastic article. In one embodiment, the luminescent nanoparticles are coated with an adhesive agent before coating the plastic article. The adhesive agent can be any adhesive known to a person of skill in the art. In one embodiment, the adhesive agent coating acts to adhere the luminescent nanoparticles to the plastic article.

In one embodiment, the plastic article is coated with a polymeric coating before the article is coated with the luminescent nanoparticles. In one embodiment, the polymeric coating acts as a binder to bind the luminescent nanoparticles to the plastic article. In one embodiment, the luminescent nanoparticles are coated with an adhesive agent before coating the plastic article. The adhesive agent can be any adhesive known to a person of skill in the art. In one embodiment, the adhesive agent coating acts to adhere the luminescent nanoparticles to the plastic article.

The luminescent may be applied to the plastic article using any method known to a person of skill in the art. In one embodiment, the plastic article is sprayed with a solution comprising the luminescent nanoparticles to form the coating. In one embodiment, the plastic article is dipped into a solution comprising the luminescent nanoparticles to form the coating. In one embodiment, the plastic article is heated to soften the article and the luminescent nanoparticles are pressed into the softened plastic. In one embodiment, the luminescent nanoparticles are printed onto the surface of the plastic article to form a coating. In one embodiment, the luminescent nanoparticles are coated with a binder and then printed onto the surface of the plastic article. In one embodiment, portions of the plastic article are covered with a coating comprising the luminescent nanoparticles to form a design. In one embodiment, the coating of luminescent nanoparticles is applied to the plastic article as a solution comprising the luminescent nanoparticles. In one embodiment, the coating of luminescent nanoparticles is applied to the plastic article in a solid form such as a powder.

In one embodiment, the article comprising the luminescent nanoparticles comprises a metal or composite article. The metal or composite article can be any metal or composite article known to a person of skill in the art. In one embodiment, the metal article is a copper article. In one embodiment, the metal article is an aluminum article. In one embodiment, the metal or composite article comprises luminescent nanoparticles that are dispersed throughout the metal or composite article. In one embodiment, the metal or composite article is covered with a coating comprising the luminescent nanoparticles. Exemplary methods of coating the article are described under the plastic article. In one embodiment, the metal article is treated to reduce its surface energy before it is covered with a coating comprising the luminescent nanoparticles. In one embodiment, the metal article is sanded with abrasive materials to reduce its surface energy before it is covered with a coating comprising the luminescent nanoparticles. In one embodiment, the metal article is coated with shellac or an adhesive before it is covered with a coating comprising the luminescent nanoparticles. In one embodiment wherein the metal article is coated with shellac or an adhesive, the luminescent nanoparticles are pressed onto the areas of the metal article that are coated with the shellac/adhesive.

EXPERIMENTAL EXAMPLES

The invention is now described with reference to the following Examples. These Examples are provided for the purpose of illustration only, and the invention is not limited to these Examples, but rather encompasses all variations that are evident as a result of the teachings provided herein.

Materials and Methods

Synthesis and Characterization of PLNPs

PLNPs are synthesized via a wet chemical method adapted from Lin et al. (Lin, Yuanhua et al., Journal of Alloys and Compounds, 2003, 36: 92-95). Stoichiometric amounts of precursors were mixed in deionized water and heated to 80° C. under vigorous stirring. Ammonium hydroxide was added dropwise to initiate nucleation and growth of hydroxide nanocrystals. This solution was then placed in an autoclave and heated to 180° C. The precipitate was then dried, collected, and heated in a tube furnace at 1100° C. for 8 hours, resulting in the desired nanocrystalline structure.

To date, $LaAlO_3$, $GdAlO_3$, $BaZnO_3$, $SrZnO_3$, $Gd_2O_3$, and $SrAl_2O_4$ nanoparticles doped with between 0.25 mol % and 5 mol % of the rare-earth elements holmium, europium, dysprosium, erbium, lutetium, thulium, samarium, terbium, ytterbium, and/or cerium have been synthesized. These rare-earth elements are widely known for their unique and strong optical properties with absorption and emission lines ranging from the ultraviolet to the far infrared (Chen, Guanying et al., Chem. Rev., 2014, 114: 5161-5214; DaCosta, Matthew V. et al. Analytica Chimica Acta, 2014, 832: 1-33). Through this synthesis method, a small percentage of the host crystal atoms were replaced with a rare-earth element which provides the luminescent properties of the nanoparticles.

Figure 3A:
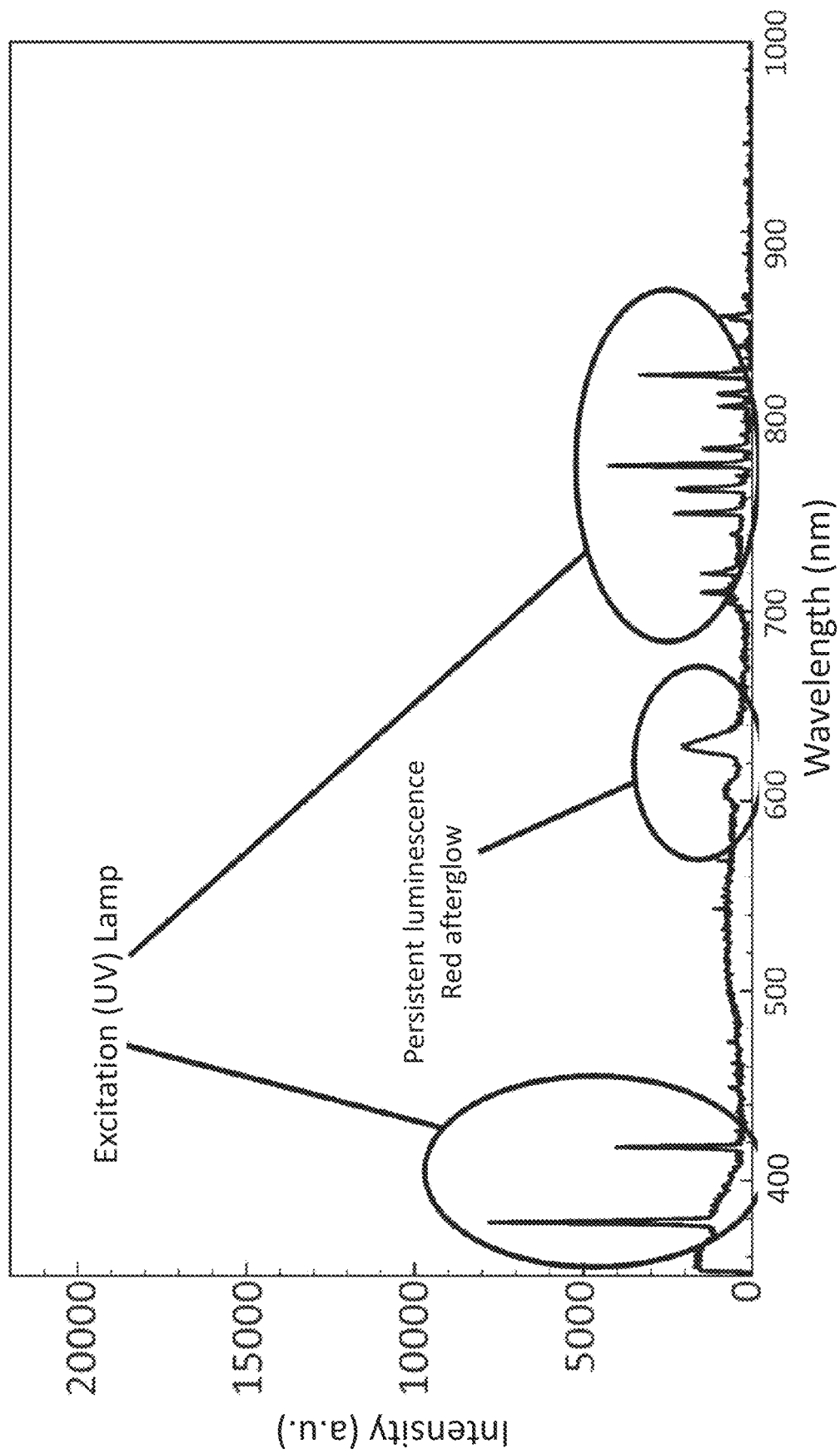
FIG. 3A depicts the emission spectra of $LaAlO_3$ under 304 nm excitation.
Figure 3B:
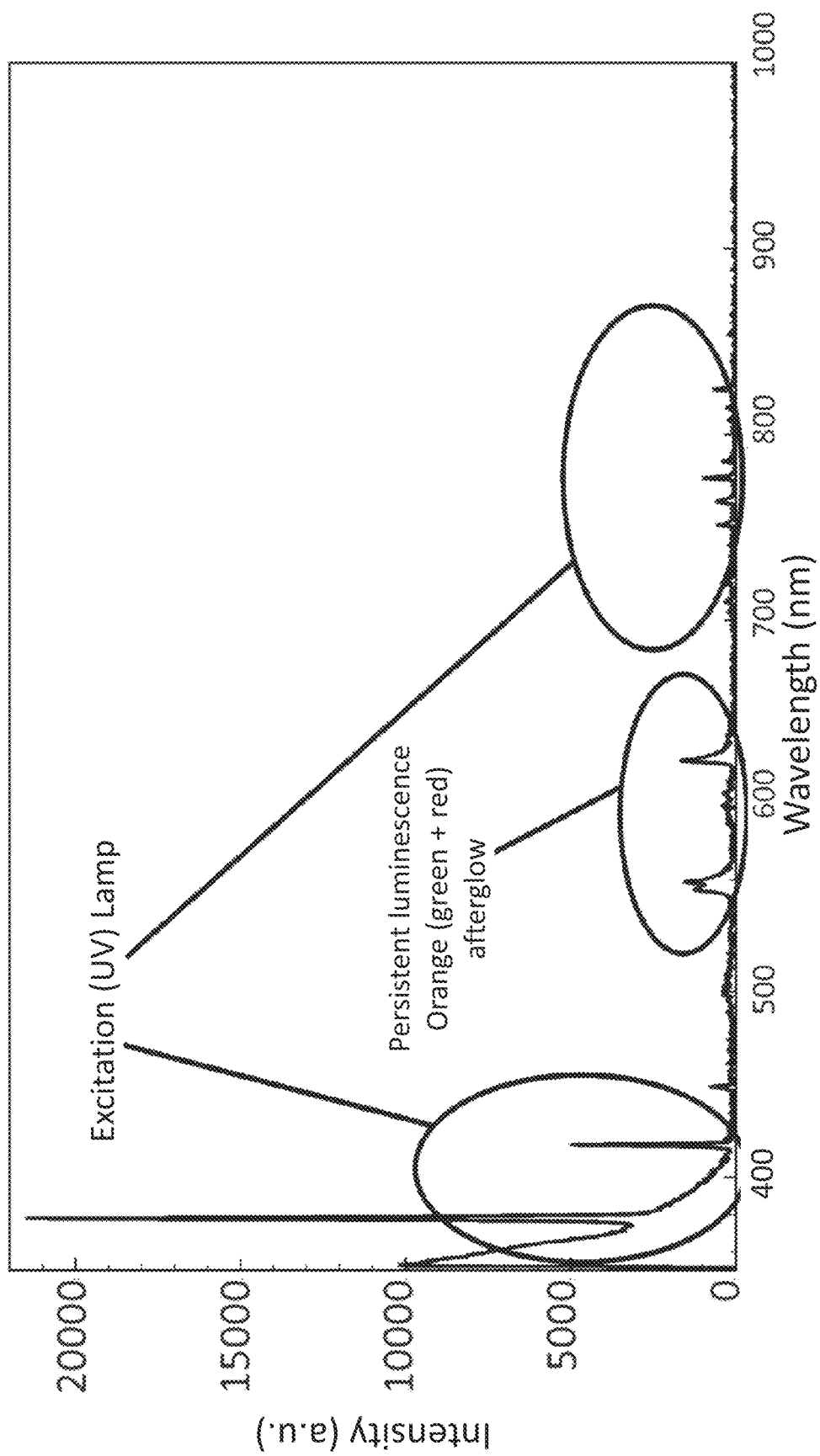
FIG. 3B depicts the emission spectra of $SrAl_2O_4$ under 304 nm excitation.
Figure 3C:
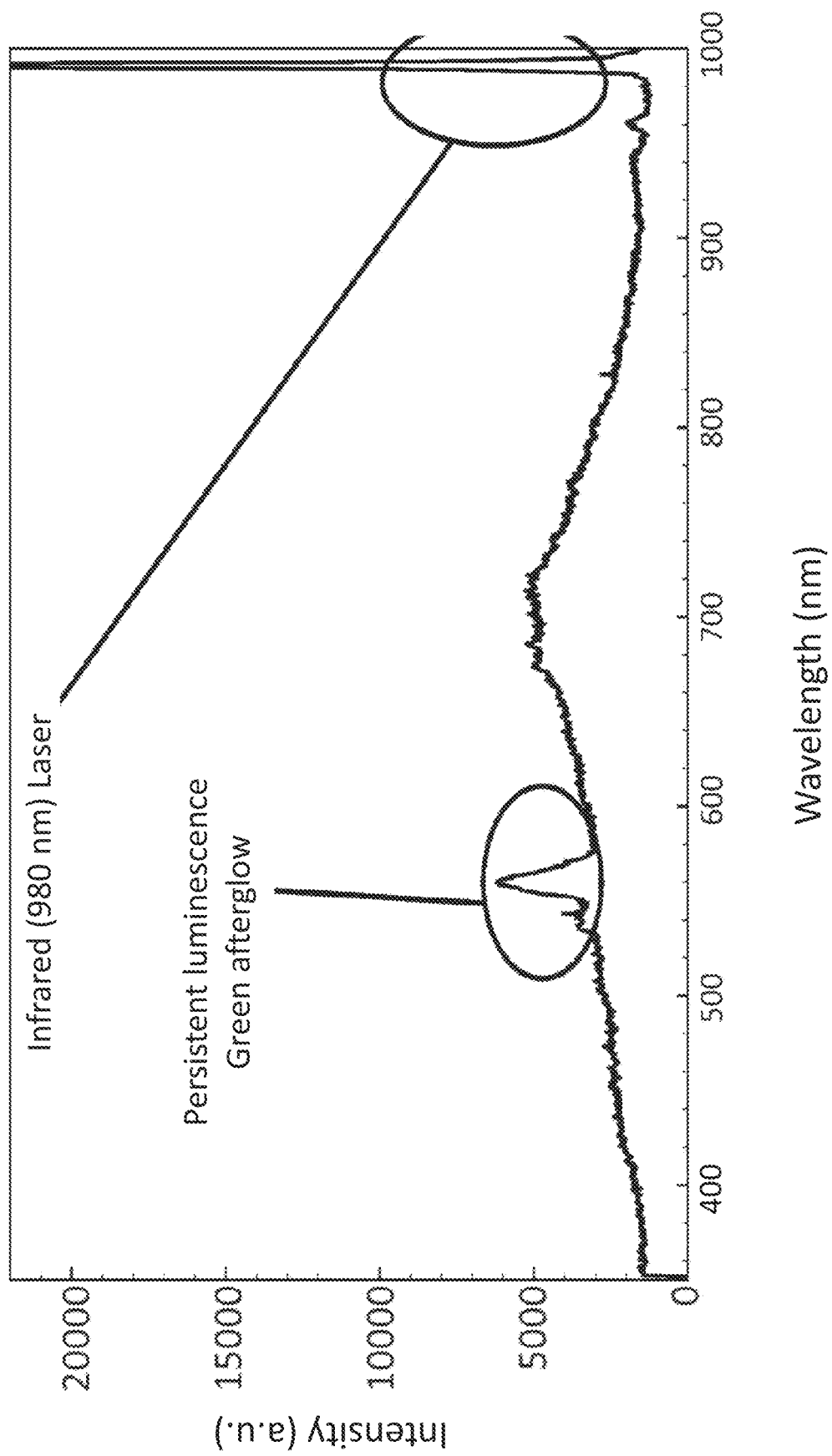
FIG. 3C depicts the spectral characterization of synthesized PLNPs.

The PLNP samples synthesized thus far exhibited visible luminescence under ultraviolet excitation (304 nm) and short-lived persistent luminescence up to one minute. The emission spectra of as-obtained samples show the typical visible emission of europium centered at 625 nm and holmium emission at 555 nm (see FIGS. 3A-C). Future samples will undergo an additional heat treatment at 1500° C. at an external user facility to generate more oxygen vacancies within the host nanocrystals.

Results and Discussion

The present invention relates in part to expanding the well-known phenomenon of persistent luminescence to a new spectral region, the infrared region, and then apply it to a new field of textiles. To date, the vast majority of work done in persistent luminescent materials has been in the visible region (Xu, Jian et al., J. Luminescence, 2019, 205:581-620; Van den Eeckhout, K. et al., Materials, 2013, 6:2789-2818). Exploring this phenomenon in a different spectral region is of interest from a basic materials science perspective as well as an applied science perspective. Persistent luminescent nanoparticles (PLNPs) will be synthesized, characterized, and integrated into fibers. The goal of this work is to generate new knowledge of both the basic physical principles of persistent luminescence in the infrared region and the applied science methodology of incorporating these types of nanoparticles into textiles and other products. The textile material (or other product) will exhibit luminescence, and if desired, persistent luminescence when UV light is shone upon the material.

There are many practical and entrepreneurial applications of textiles and other materials comprising PLNPs, yet there has been very little published research on incorporating persistent luminescent materials into textiles, fabrics, and other materials. Beyond the novelty of incorporating these materials, there are unexplored real-world applications for low-light identification of individuals. Some of the applications for this material could be for uniforms worn in low light conditions when a stealthy method of identifying ally from enemy is required, survival suits for sailors, fishermen/women, and others who need to abandon a ship or boat, as a search and rescue vessel could use an excitation light source to help spot the suit in the ocean due to the fluorescent color, particularly in low light conditions, and could be applied to the uniforms of sailors to make search and rescue easier when they inadvertently fall off of a boat/ship. Treated materials could also be used on vehicles to help identify them during low light operations, as well as on tents, tarps, and other materials that may need identification in low light conditions.

Specifically, tactical missions and search-and-rescue operations would benefit greatly from their use, providing an ability to identify and/or locate individuals at a distance in low-light situations without external light sources like spotlights or reflecting lasers. For example, the textile comprising PLNPs can be incorporated into uniforms for use during tactical missions and search-and-rescue operations. These nanoparticle-infused textiles will have the capability to be "charged up" by an excitation source such as an ultraviolet lamp, prior to being deployed in the field. Once "charged up", they will constantly emit light in the infrared region. While not visible to the naked eye, this light is easily detected with infrared and night vision cameras. In low-light situations, such as nighttime combat or search missions, individuals will be easy to identify and/or locate due to this persistent infrared luminescence.

The inventive materials offer an advantage over available night vision because emission wavelengths will be specific to the uniforms and not from broadband infrared heat emissions that all warm bodies give off. This will allow image multiplexing to demarcate those in the PLNP-infused uniforms from any background heat signatures or other warm bodies. The capability to distinguish between an individual vs. a group of people plus an individual vs. a homogenous group is not possible with existing technology. One can imagine a scenario in which a team of operatives, in a combat or rescue capacity, moves into an area of other individuals under the cover of night. Currently, any support or backup would not be able to distinguish between teammates and other individuals through night vision imaging. With the addition of persistent luminescent uniforms, team members would be clearly distinguished by infrared emitting uniforms while others would only emit typical broadband infrared.

Additionally, the inventive PLNPs can be mixed with polymer pellets and formed into fibers or other desirable shapes through extrusion, injection molding, blow molding, or any other polymer forming process. The PLNPs can also be applied to materials, such as textiles, metals, composites, and plastics via a binder. The particles and binder can be mixed together and applied to the material either over the entire product or in a desired configuration, such as a design. Another method of applying the treated particles is to use a printer, such as a printer that is used to print with pigments, where the pigment is mixed with a binder prior to printing on the material. A third method of applying the treated particles is to apply a binder to the material and then add the particles as a powder so that they are concentrated where the binder has been applied. The treated material, if of a thermoplastic nature, can also be softened using heat, and the particles can then be added or pressed into the softened plastic so that as the plastic cools it holds the particles.

This project relates in part to:
(1) obtaining nanoparticles with infrared persistent luminescence;
(2) advancing the understanding of the physical mechanisms which lead to persistent luminescence;
(3) integrating PLNPs into fibers that can be used to form novel textiles;
and
(4) integrating PLNPs into other articles.

Obtaining Nanoparticles with Infrared Persistent Luminescence

In order to obtain samples with infrared persistent luminescence, rare-earth elements with strong infrared emission are doped into nanocrystalline hosts. Specifically, ytterbium and neodymium, which have emissions at 980 nm, 808 nm, and 1064 nm respectively, are doped into $SrAl_2O_4$ and $Y_2O_3$ nanoparticles. Some engineering of the bandgap of these materials is carried out by co-doping with magnesium and other rare-earth elements which should result in systems with energy traps and emitter levels within the bandgap. Absorption and emission spectroscopy of all samples is carried out.

$LaAlO_3$, $Gd_2O_3$, and $SrAl_2O_4$ nanoparticles doped with 1 mol % of the rare-earth elements holmium and europium exhibited visible luminescence under ultraviolet excitation (304 nm) and short-lived persistent luminescence up to a few seconds. An additional heat treatment at 1500° C. at an external user facility can generate more oxygen vacancies within the host nanocrystals. Heat treatment in a high temperature furnace (up to 1500° C.) may be needed to synthesize very long (on the order of hours) persistent luminescent nanoparticles.

From a basic materials science perspective, exploring persistent luminescence in the infrared region is an important scientific endeavor since the exact physical mechanisms which lead to persistent luminescence are still poorly understood. It is generally accepted that oxygen vacancies in the host crystal act as traps for energetic electrons (Xu, Jian et al., J. Luminescence, 2019, 205:581-620). Slowly over time, this energy is transferred to the rare-earth atoms in the crystal which in turn release the energy as light (Xu, Jian et al., J. Luminescence, 2019, 205:581-620; Van den Eeckhout, K. et al., Materials, 2013, 6:2789-2818; Zhuang, Yixi et al., Optical Materials, 2014, 36:1907-1912). The most successful models for explaining this behavior describe the energy levels of the energy traps and the emitting atoms as within the bandgap of the host material (Zhuang, Yixi et al., Optical Materials, 2014, 36:1907-1912; Luo, Hongde et al., J. Phys. Chem. C, 2017, 121:8760-8769; Wang, Jie et al., Nanoscale, 2017, 9:6204-6218). Most of the experimental and theoretical work on these materials has only explored systems where the bandgap and trap energy levels are in the visible region.

Figure 4:
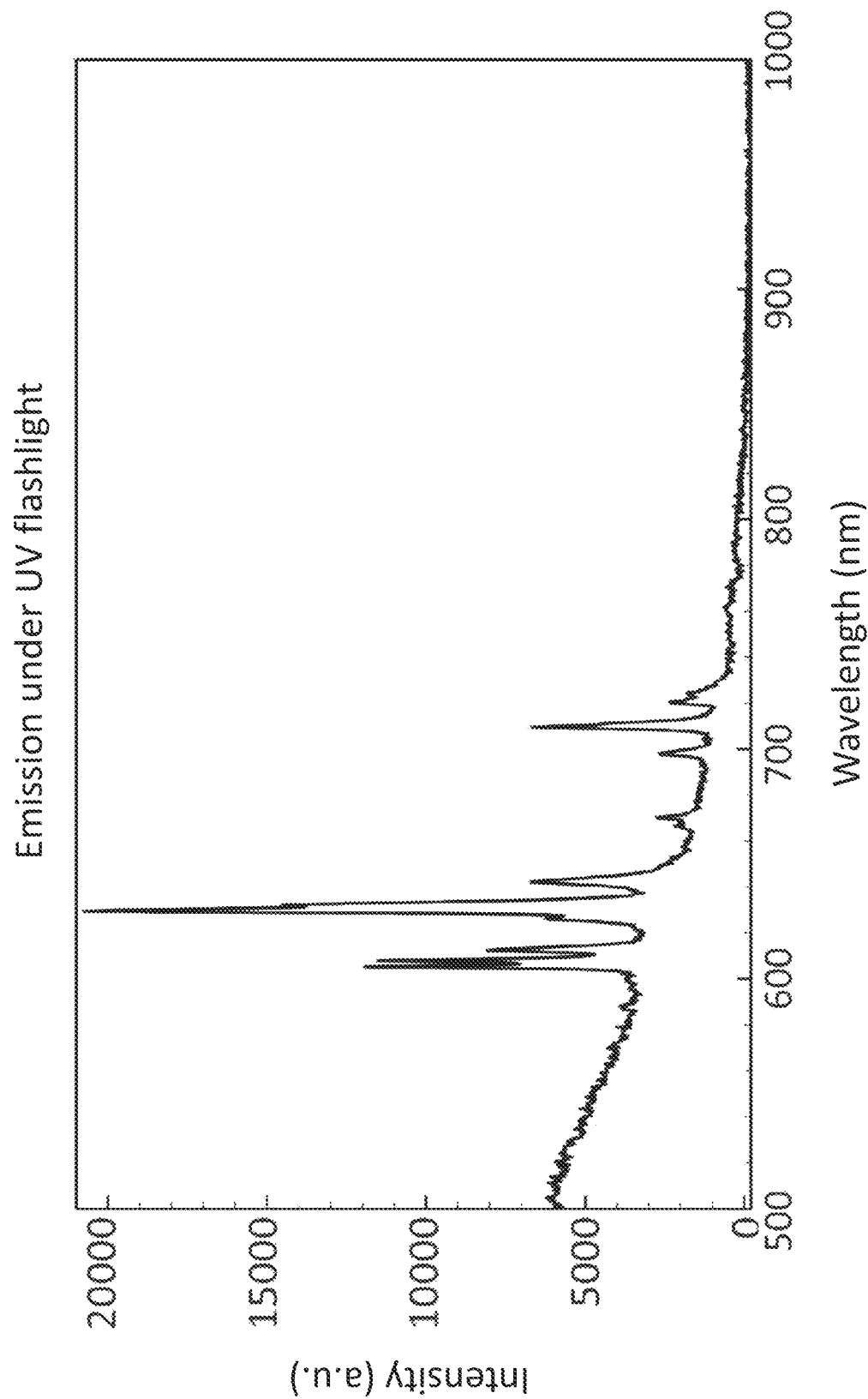
FIG. 4 is a plot showing the infrared emission (698, 709, and 720 nm) of GdAlO3: Eu, Lu emitting under illumination from a 365 nm flashlight.
Figure 5:
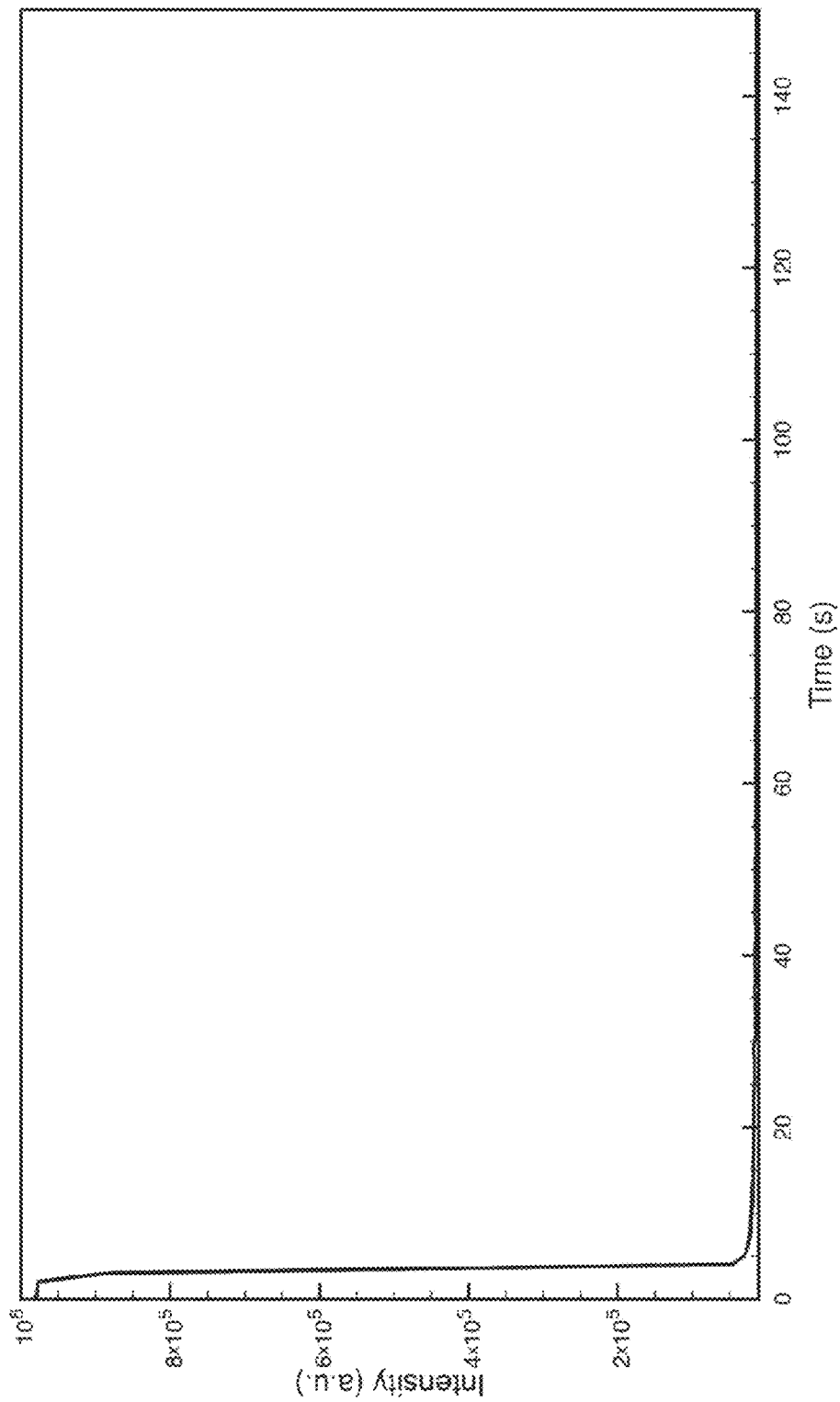
FIG. 5 is a plot showing the persistent luminescence of $LaAlO_3$: Eu, Dy after 10 minutes of exposure to 305 nm light. The plot shows the full intensity drop from turning off the excitation source.

The present invention relates in part to compositions in which the bandgap and trap energy levels are in the infrared region. For example, FIG. 4 is a plot of $GdAlO_3$: Eu, Lu emitting in the infrared (698, 709, and 720 nm) under illumination from a 365 nm flashlight. FIG. 5 is a plot showing the persistent luminescence of $LaAlO_3$: Eu, Dy after 10 minutes of exposure to 305 nm light; the plot shows the full intensity drop from turning off the excitation source.

Figure 6:
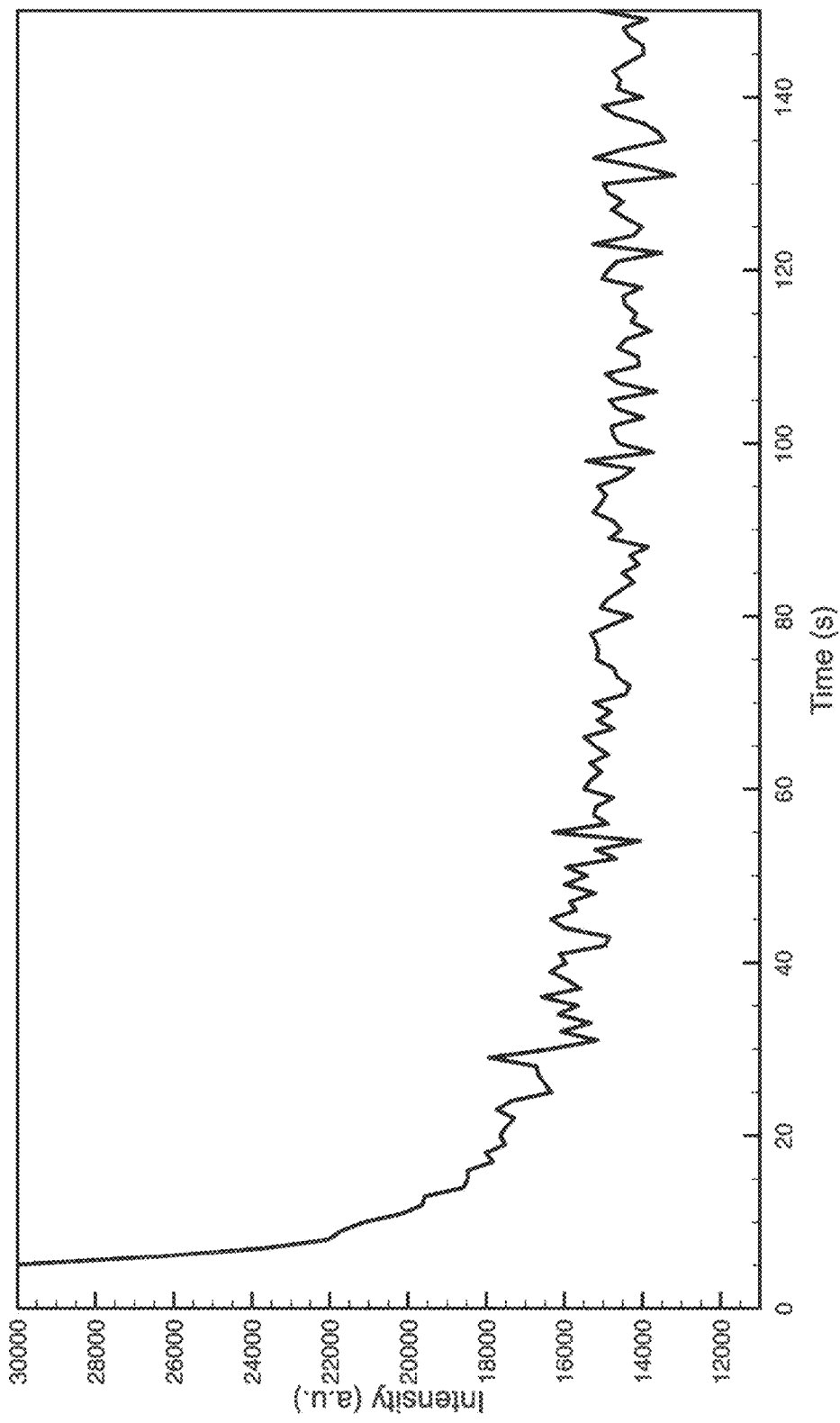
FIG. 6 is a plot showing the persistent luminescence of $LaAlO_3$: Eu, Dy after 10 minutes of exposure to 305 nm light. The plot is an enhanced view of FIG. 5, showing detectable persistence up to 60 s after turning off the UV light.

FIG. 6 is an enhanced view of the plot of FIG. 6, showing detectable persistence up to 60 s after turning off the UV light.

Integrating PLNPs into Fibers that can be Used to Form Novel Textiles

Luminescent nanoparticles that exhibit luminescence when exposed to UV light have been synthesized, affixed to fabric, and incorporated into plastic.

The nanoparticles are incorporated into textile fibers using spray-on and electrospinning techniques (Dong, Guoping et al., Optics Express, 2009, 17:22514-22519; Li, Xiaoyan et al., J. Luminescence, 2012, 132:81-85), yielding fabrics with persistent luminescence in the infrared. PLNPs may be sonicated in a solution with surface coating polymers, such as polylactic acid or polyvinylpyrrolidone, which bind to the surface of the host nanoparticles. For the spray-on method, these solutions can then be applied to the target fibers by a fine spray followed by a low-temperature treatment. For the electrospinning method, these solutions can be processed through electrospinning equipment to produce polymeric fibers with the PLNPs integrated into them. Nanoparticles that exhibit persistent luminescence for several hours after being exposed to an excitation source are affixed to fabrics in a concentration high enough to allow for effective illumination of the fabric, but not concentrated enough to be visually evident to the naked eye that there is something unique about the fabric.

Ripstop woven nylon and spunbond polyester nonwoven fabrics were sprayed with a 20% solids solution of Omnova GF 2544 using a handheld sprayer. PLNPs of the $LaAlO_3$: Eu,Dy type were added on top of the adhesive layer and the fabrics were placed in an oven at 105° C. for five minutes. Entire swatches and sections of other swatches were treated in this manner. Under UV light, the areas containing PLNPs exhibited luminescence, while those without the particles did not exhibit luminescence. The particles were applied heavily in one area, this could be incorporated as part of a camouflage pattern, especially in patterns that utilize lighter colors, such as winter or desert patterns.

Figure 7:
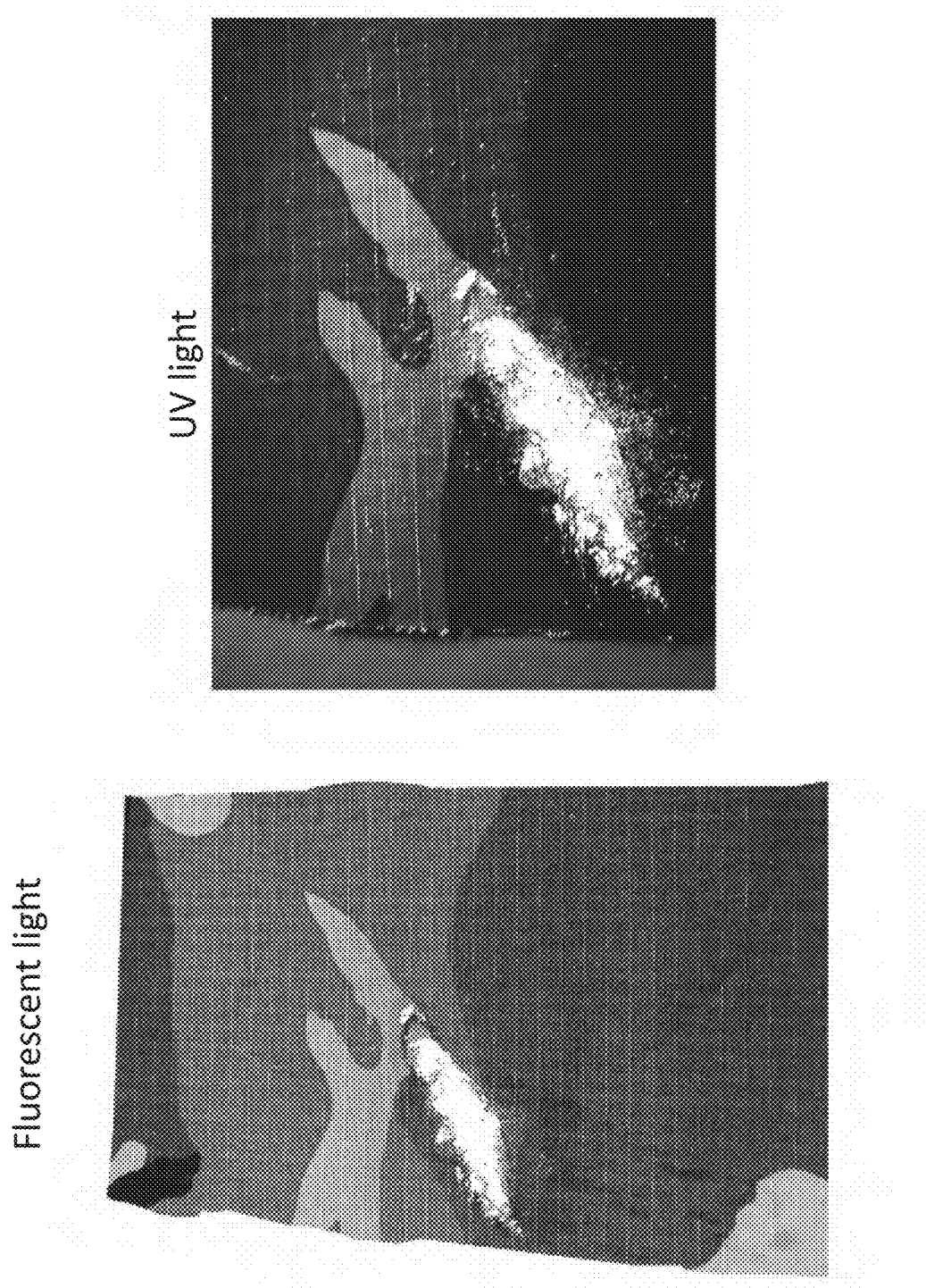
FIG. 7 shows a printed ripstop nylon with PLNPs applied via latex bonding under fluorescent and UV light.

The ripstop nylon fabric had previously been printed, this did not affect the luminescence of the material after treatment. The PLNPs were bound to the camouflage-printed ripstop fabric with latex bonding. FIG. 7 shows the ripstop nylon article under fluorescent and UV lighting.

Figure 8:
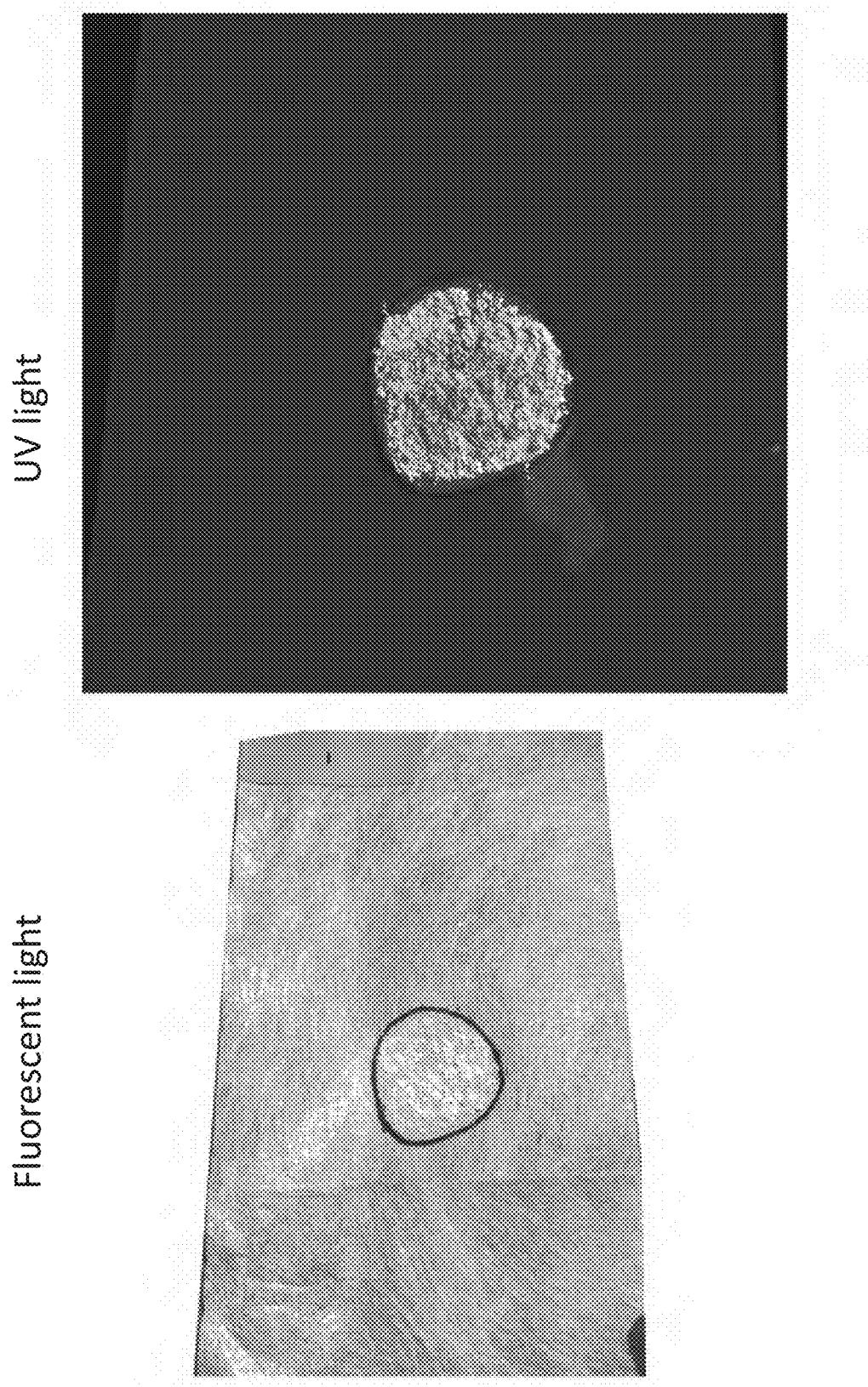
FIG. 8 shows a spunbond polyester fabric with PLNPs applied via latex bonding under fluorescent and UV light.

Similarly PLNPs were bound to spunbound polyester fabric via latex bonding. FIG. 8 shows the PLNP-treated spunbound polyester article under fluorescent and UV lighting.

Figure 9:
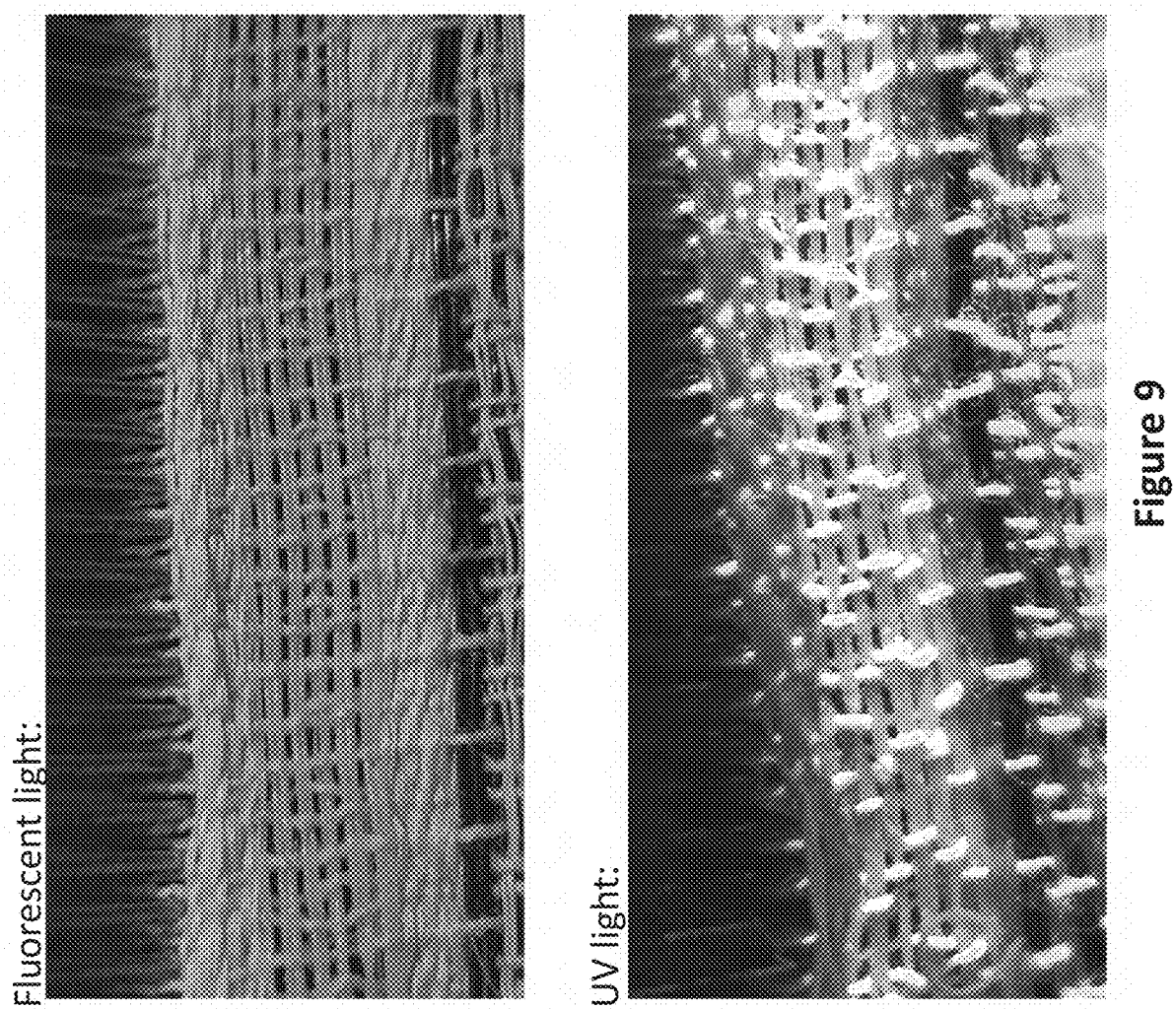
FIG. 9 shows a fabric woven on a handloom with PLNP containing filaments and non PLNP containing filaments under fluorescent light and infrared light.

Filaments containing PLNPs, produced using a Haake Mini CTW extruder, were woven into a fabric using a handloom. The filaments were alternated with filaments not containing PLNPs. Under UV light, only the PLNP-containing filaments exhibited luminescence (FIG. 9).

Figure 10:
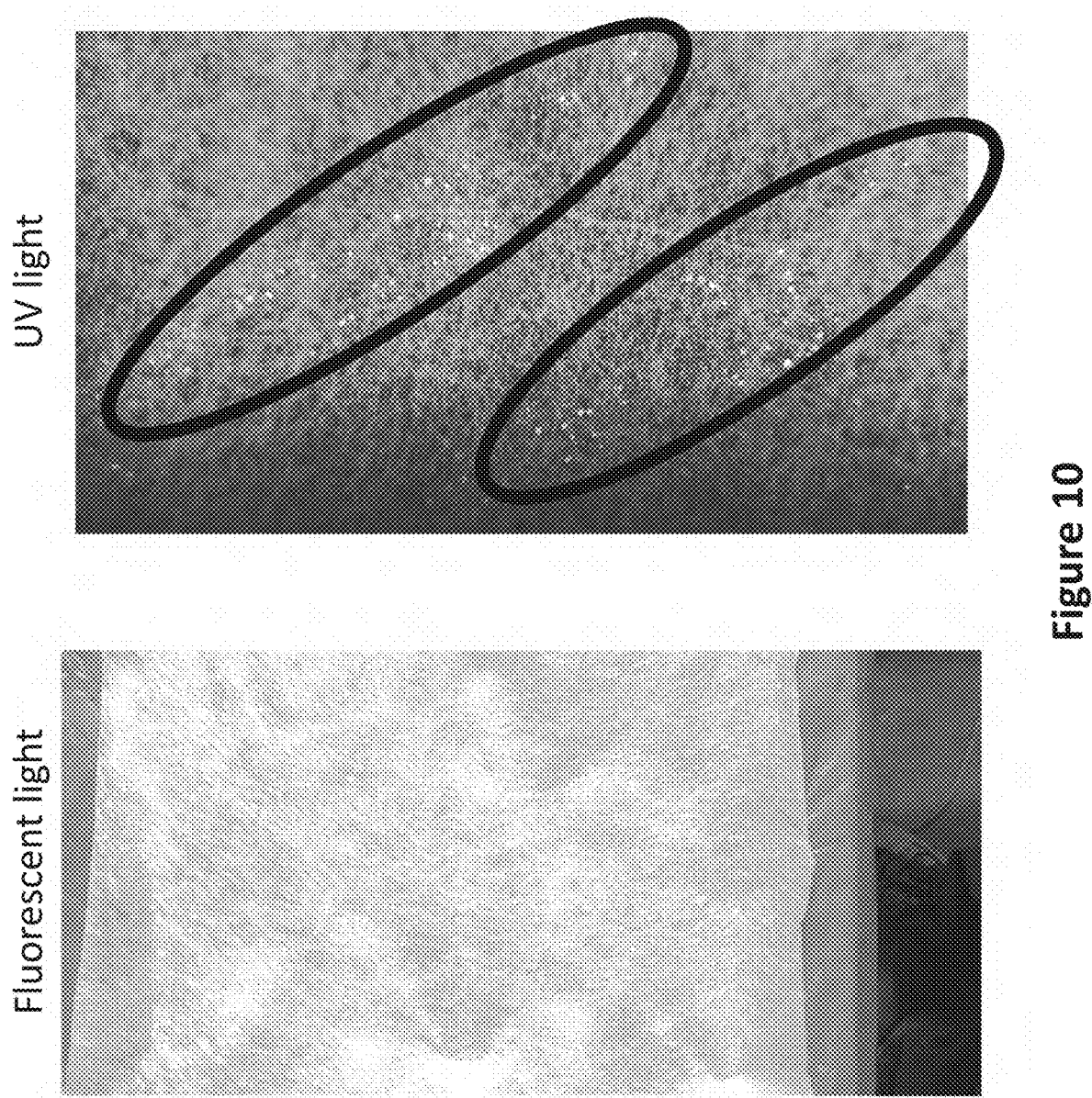
FIG. 10 shows a printed spunbond polyester under fluorescent light and UV lights.

A mix of 6.2 grams of Speedball screen printing transparent base, 12.4 grams of water, and 0.05 grams of $LaAlO_3$: Eu,Dy particles were mixed together in a beaker with a glass rod. The mixture was printed onto a polyester spunbond fabric using a typical screen used for screen printing and a squeegee. The fabric was then dried in a through air oven at 95° C. for 5 minutes, then examined under both fluorescent and UV lights. The areas that were printed displayed persistent luminescence under UV light, whereas the areas that were not printed did not exhibit such luminescence (FIG. 10).

Figure 11:
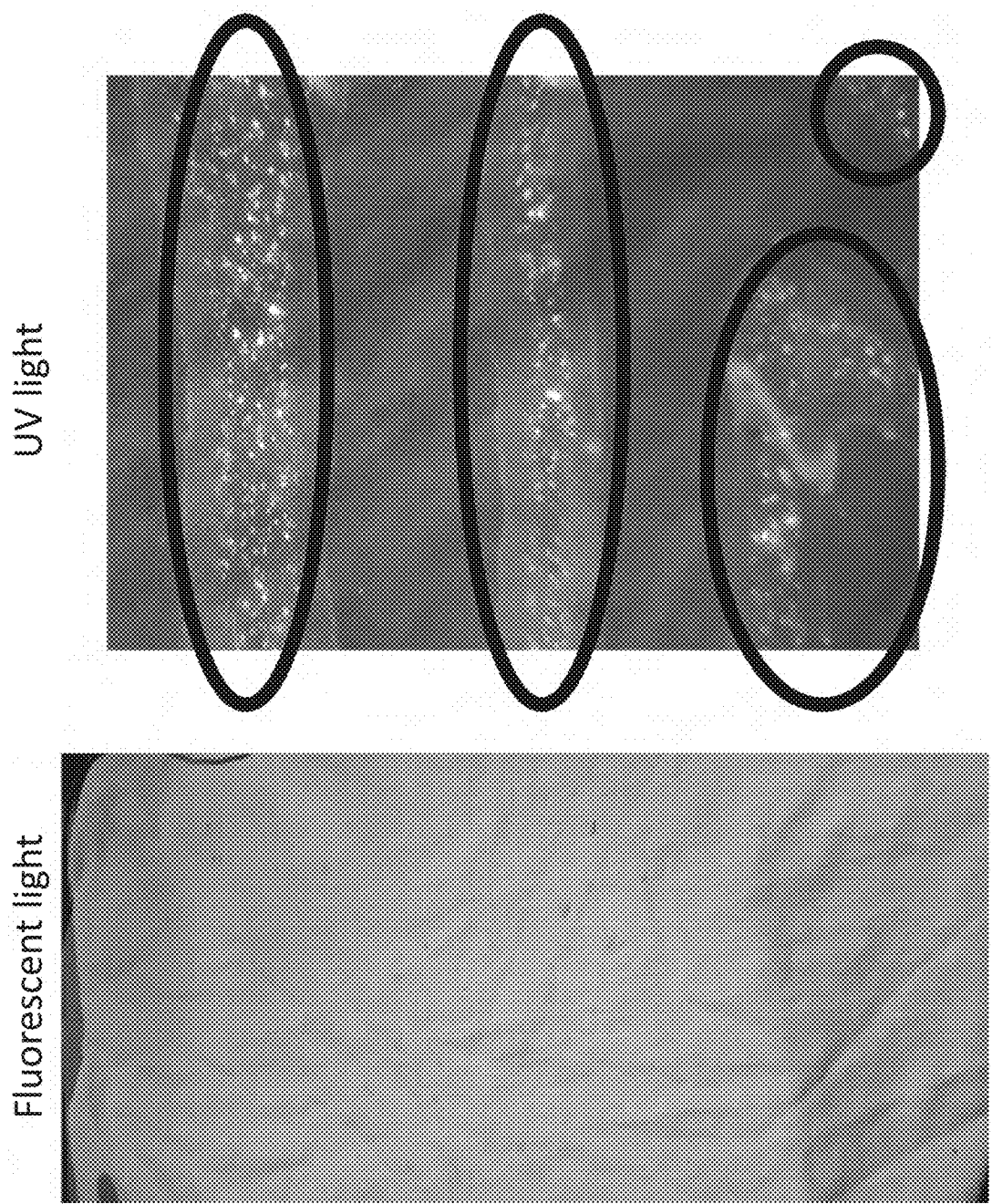
FIG. 11 shows a printed plain weave cotton fabric under fluorescent and UV lights.

A mix of 6.2 grams of Speedball screen printing transparent base, 12.4 grams of water, and 0.05 grams of $LaAlO_3$: Eu,Dy particles were mixed together in a beaker with a glass rod. The mixture was printed onto a plain weave cotton fabric using by hand using a glass rod to form lines on the fabric. The fabric was then dried in a through air oven at 95° C. for 5 minutes, then examined under both fluorescent and UV lights. The areas that were printed displayed persistent luminescence under UV light, whereas the areas that were not printed did not exhibit such luminescence (FIG. 11)

Figure 12:
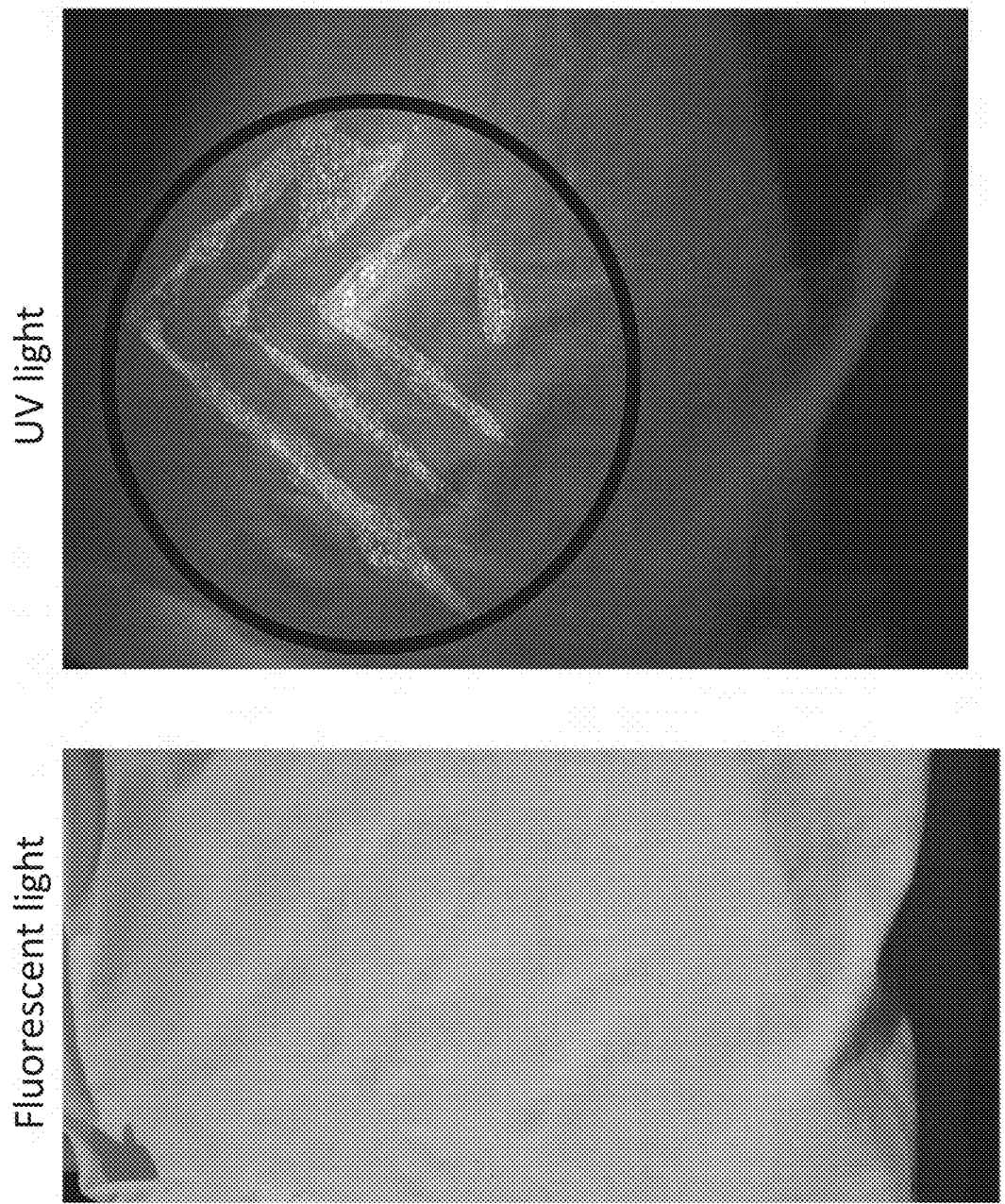
FIG. 12 shows a printed twill weave cotton polyester blended fabric under fluorescent and UV lights.

A mix of 7 grams of Speedball screen printing transparent base, 10 grams of water, and 0.20 grams of $LaAlO_3$: Eu,Dy particles were mixed together in a beaker with a glass rod. The mixture was printed onto a twill weave cotton polyester blended fabric by hand using a printing screen made from aluminum screen, similar to a regular screen printing screen but with larger openings, and a squeegee to form a series of chevrons on the fabric. The fabric was then dried in a through air oven at 95° C. for 5 minutes, then examined under both fluorescent and UV lights. The areas that were printed displayed persistent luminescence under UV light whereas the areas that were not printed did not exhibit such luminescence (FIG. 12).

Integrating PLNPs into Other Articles

Figure 13:
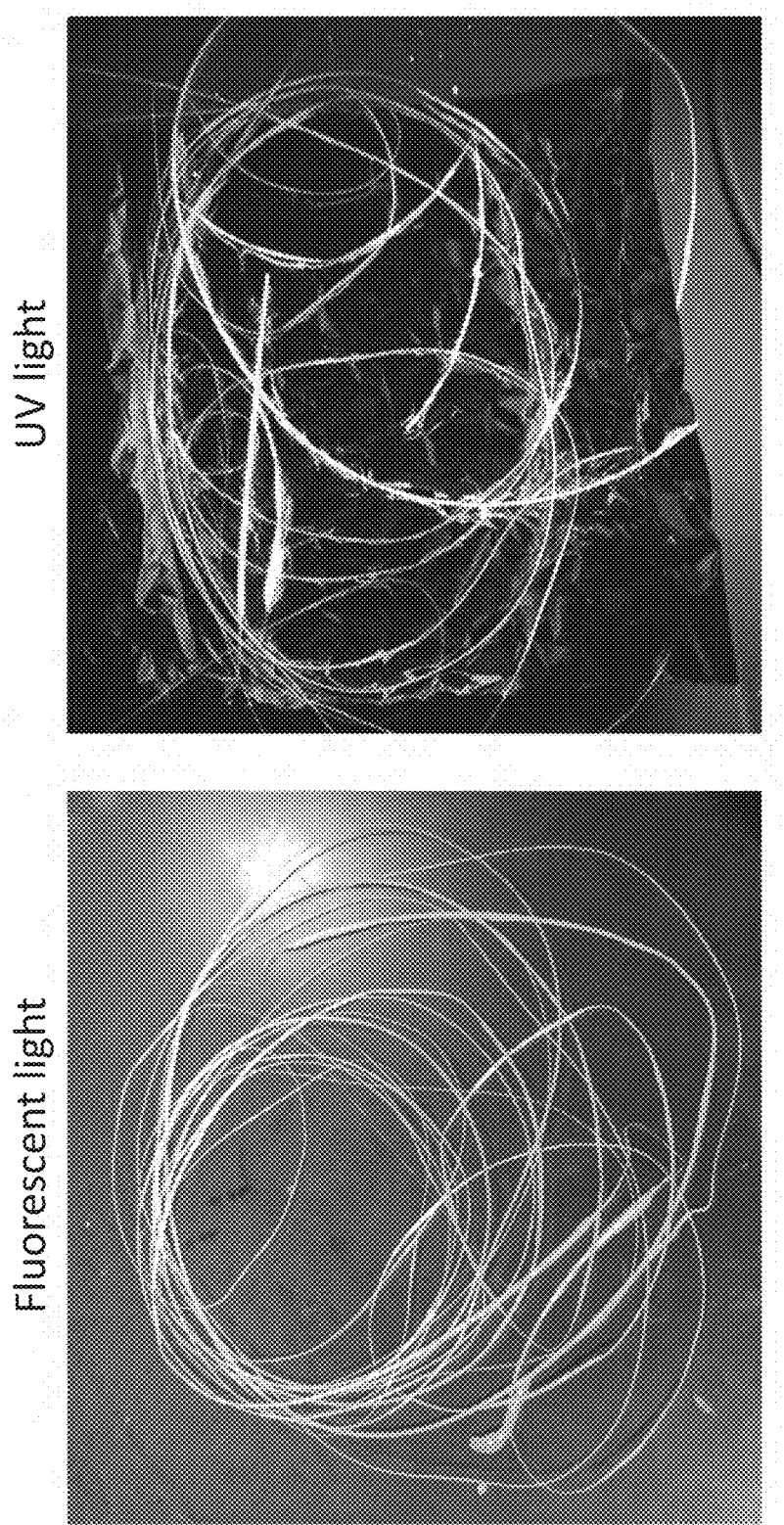
FIG. 13 shows polypropylene filaments containing PLNPs under fluorescent and UV lights.

PLNPs in powder form were mixed with polypropylene pellets and then extruded as filaments using a Haake Mini CTW extruder. Pure polypropylene pellets were also extruded as filaments. When the two materials were exposed to a UV light source those with the PLNPs exhibited luminescence, whereas the pure polypropylene filaments did not (FIG. 13). Filaments containing 0.1% to 75% percent PLNPs have been produced, but the loading could vary from 0.01% to 90% PLNPs.

Figure 14:
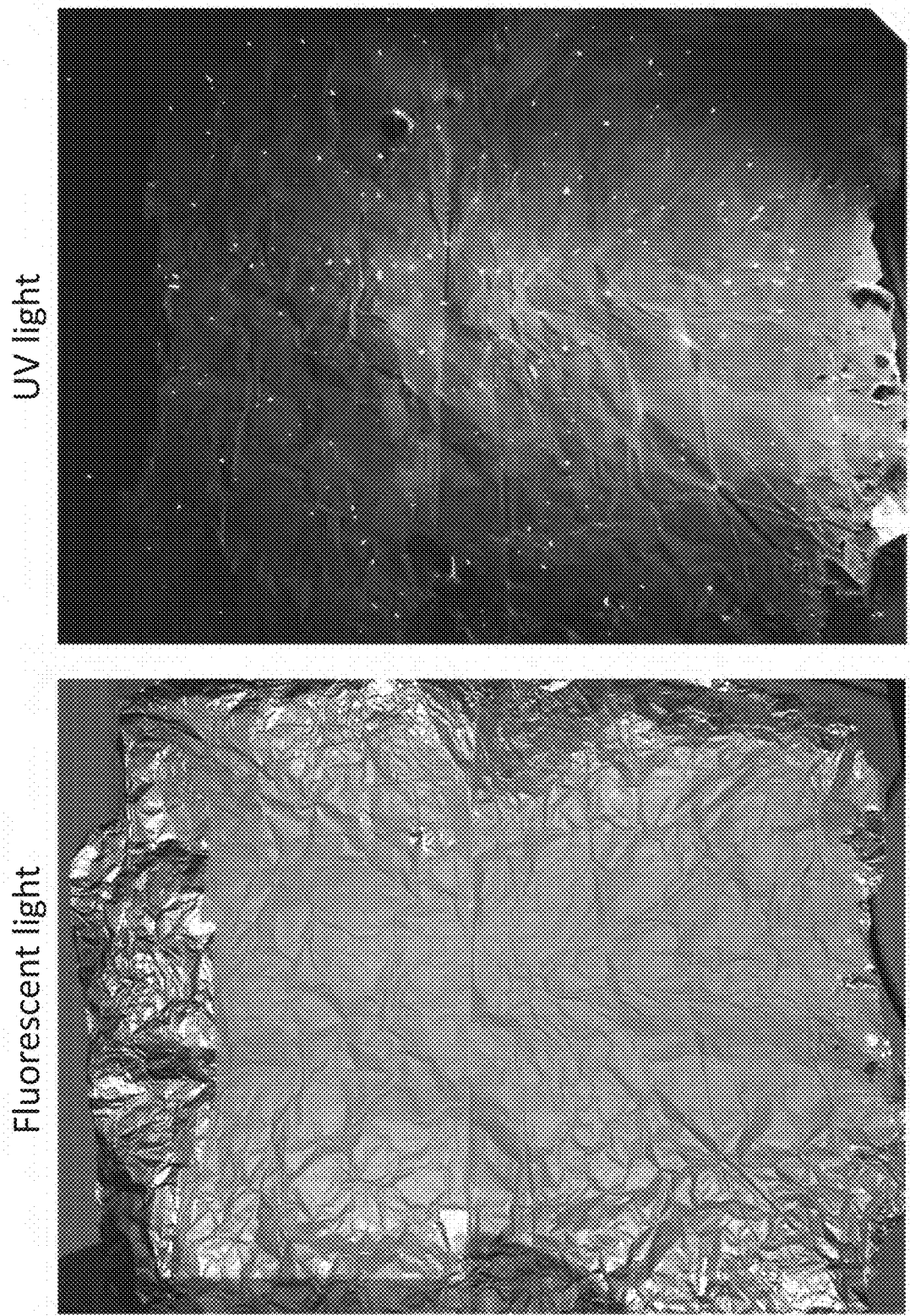
FIG. 14 shows a polypropylene sheet containing 10% PLNP under fluorescent light and UV light.

PLNPs and polypropylene were extruded into a 3-dimensional form and then pressed with a Wabash Genesis hot press at 0.1 tons of pressure for 60 seconds at a temperature of 180° C. The flattened product exhibited luminescence when exposed to a UV light (FIG. 14), indicating that the particles can withstand further processing after being formed into a product. These flattened sheets have PLNP loadings of 10% to 75%.

PLNPs were mixed with polypropylene pellets and then injection molded into a mold using a commercial extruder. When exposed to a UV light source these materials exhibited luminescence. PLNPs and polypropylene were extruded into a 3-dimensional form and then pressed with a hot press at 0.1 tons of pressure for 60 seconds at a temperature of 180° C. The flattened product exhibited luminescence when exposed to a UV light, indicating that the particles can withstand further processing after being formed into a product.

Figure 15:
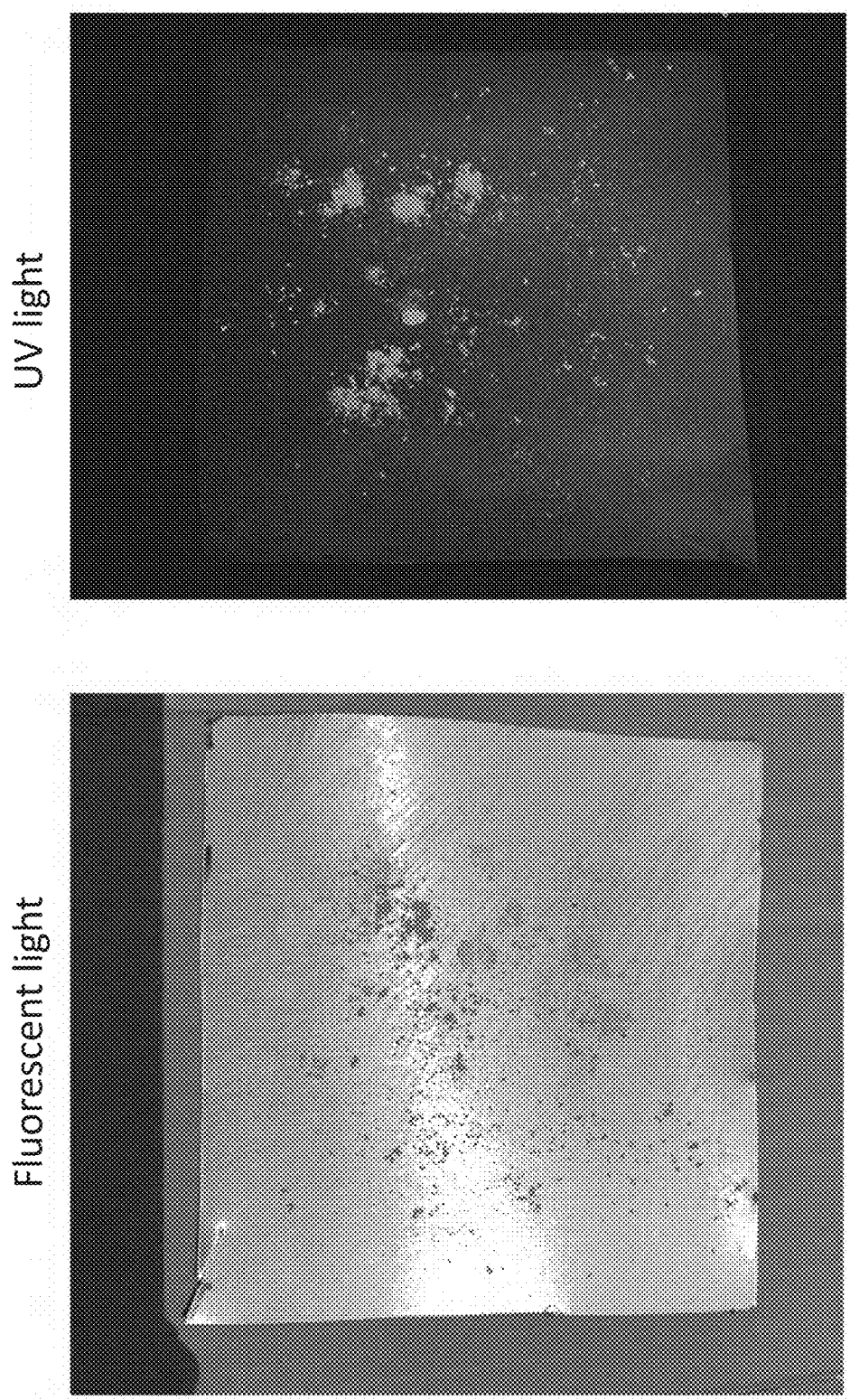
FIG. 15 shows an aluminum panel containing PLNPs under fluorescent and UV lights.

Copper and aluminum panels were treated to reduce their surface energy through the use of sanding with abrasive materials. Some panels were sprayed with shellac, some panels were sprayed with a spray on adhesive; both were from pressurized cans. PLNPs were added to the sprayed areas, and the metal panels were allowed to dry under ambient conditions overnight. Areas containing PLNPs exhibited luminescence under UV light, whereas the rest of the panels did not exhibit luminescence (FIG. 15).

Figure 16:
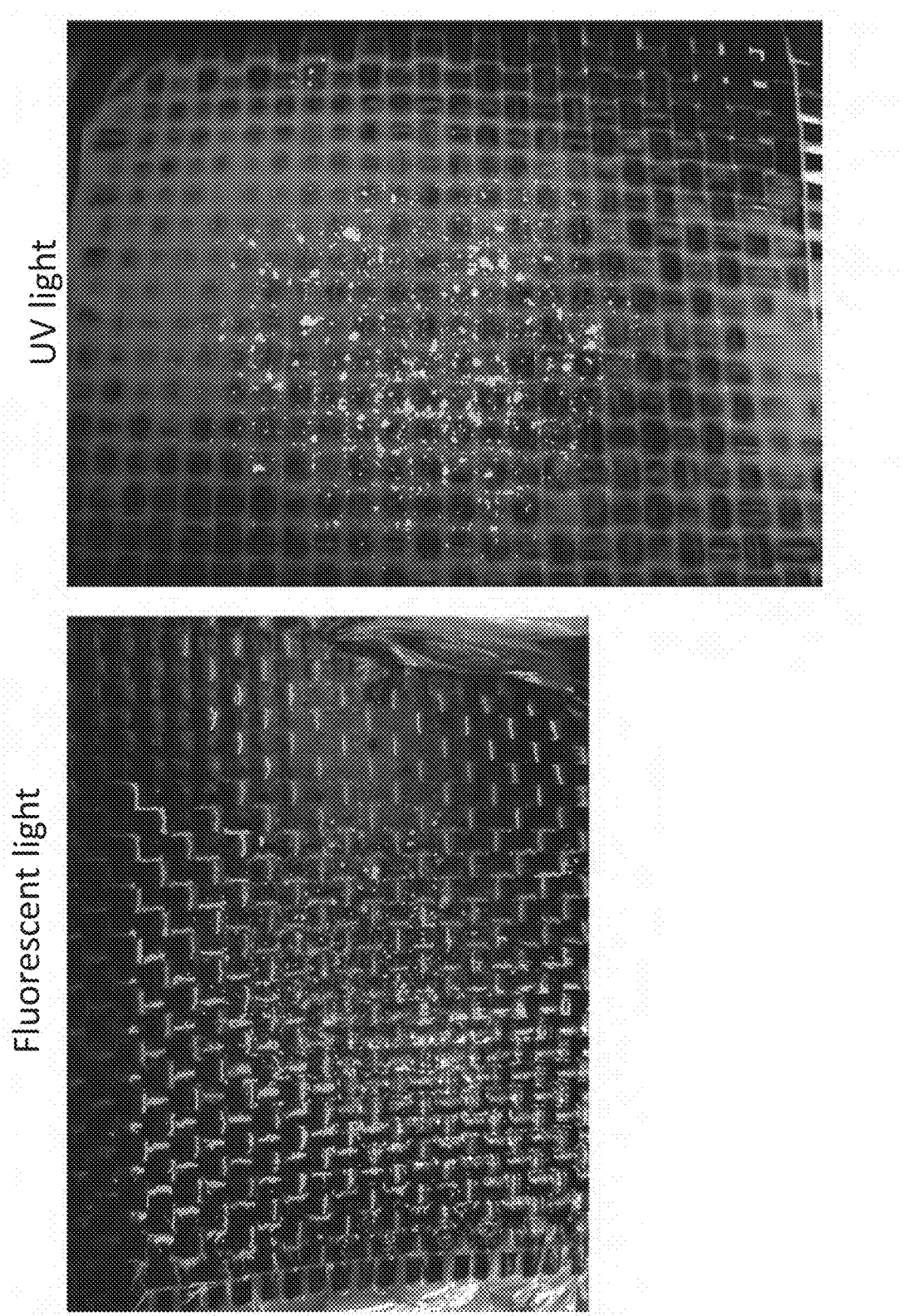
FIG. 16 shows a plain weave carbon fiber composite containing PLNPs under fluorescent and UV lights.

A plain weave carbon fiber fabric was coated with a blend of 100 grams of Fibreglast System 2000 epoxy resin and 27 grams of Fibreglast 2120 hardener that had been premixed. 0.1 grams of $LaAlO_3$: Eu,Dy PLNPs were added to the resin and then added to one specific area of the carbon fabric. The fabric was then placed in an oven at 135° C. for one hour to accelerate the cure of the composite panel. The panel was examined under fluorescent and UV light and was found to display luminescence only under UV light conditions (FIG. 16).

A twill weave glass fiber fabric was coated with a blend of 100 grams of Fibreglast System 2000 epoxy resin and 27 grams of Fibreglast 2120 hardener that had been premixed. 0.1 grams of $LaAlO_3$: Eu,Dy PLNPs were added to the resin and then added to one specific area of the carbon fabric. The fabric was then placed in an oven at 135° C. for one hour to accelerate the cure of the composite panel. The panel was examined under fluorescent and UV light and was found to display luminescence only under UV light conditions.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. An article comprising a luminescent nanoparticle, wherein the luminescent nanoparticle is selected from the group consisting of oxide nanoparticles, aluminate nanoparticles, and germanate nanoparticles; wherein the luminescent nanoparticle is doped with one or more metals or rare-earth elements; and wherein the luminescent nanoparticle comprises a polymeric coating selected from the group consisting of: polyvinylpyrrolidone, polylactic acid, latex, and combinations thereof.

2. The article of claim 1, wherein the article is selected from the group consisting of fiber, yarn, fabric, plastic, metal, and composite.

3. The article of claim 1, wherein the article emits at a visible wavelength or range of visible wavelengths after the luminescent nanoparticle is excited with an excitation source.

4. The article of claim 3, wherein the article emits in the infrared region of the electromagnetic spectrum.

5. The article of claim 3, wherein the excitation source comprises a UV light source.

6. The article of claim 1, wherein the luminescent nanoparticle is selected from the group consisting of: $LaAlO_3$ nanoparticles, $Gd_2O_3$ nanoparticles, $SrAl_2O_4$ nanoparticles, $Y_2O_3$ nanoparticles, and combinations thereof.

7. The article of claim 1, wherein the metal or rare-earth element is selected from the group consisting of: holmium, europium, ytterbium, neodymium, magnesium, and combinations thereof.

8. The article of claim 1, wherein the luminescent nanoparticle is doped with between about 0.25 mol % and about 12 mol % of one or more metals or rare-earth elements.

9. The article of claim 1, wherein the article comprises a yarn or fabric article which comprises fibers, yarn, or fabric that have been sprayed with a solution comprising the luminescent nanoparticles.

10. The article of claim 1, wherein the article comprises a yarn or fabric article which comprises fibers that have been electrospun, gel-spun, melt-spun, solvent-spun, or dry-spun from a solution or mixture comprising the luminescent nanoparticles.

11. The article of claim 1, wherein the luminescent nanoparticles comprise persistent luminescent nanoparticles.

* * * * *